US008723858B2

(12) United States Patent
Yamada

(10) Patent No.: US 8,723,858 B2
(45) Date of Patent: May 13, 2014

(54) CONTROL DEVICE, DISPLAY DEVICE AND METHOD FOR CONTROLLING DISPLAY DEVICE

(75) Inventor: Yusuke Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 171 days.

(21) Appl. No.: 13/220,784

(22) Filed: Aug. 30, 2011

(65) Prior Publication Data

US 2012/0062547 A1 Mar. 15, 2012

(30) Foreign Application Priority Data

Sep. 15, 2010 (JP) ................................ 2010-207248

(51) Int. Cl.
*G06F 3/038* (2013.01)
*G09G 5/00* (2006.01)

(52) U.S. Cl.
USPC .......................................................... 345/214

(58) Field of Classification Search
USPC ..................... 345/87, 107, 94, 530, 672, 560, 345/204–215, 690–699, 100
See application file for complete search history.

(56) References Cited

U.S. PATENT DOCUMENTS 7,012,600 B2 * 3/2006 Zehner et al. ................. 345/214
7,119,772 B2 * 10/2006 Amundson et al. ............. 345/87
7,528,822 B2 * 5/2009 Amundson et al. ........... 345/107
7,733,311 B2 * 6/2010 Amundson et al. ............. 345/87
7,868,869 B2 * 1/2011 Shin et al. ...................... 345/107
7,944,425 B2 * 5/2011 Watanuki et al. ............... 345/94
7,952,557 B2 * 5/2011 Amundson et al. ........... 345/107
8,179,387 B2 * 5/2012 Shin et al. ..................... 345/208
2001/0024188 A1 * 9/2001 Masazumi et al. ............ 345/100
2006/0139311 A1 * 6/2006 Zehner et al. ................. 345/107
2006/0202948 A1 * 9/2006 Johnson et al. ............... 345/107
2007/0188506 A1 * 8/2007 Hollevoet et al. ............. 345/530
2009/0256798 A1 * 10/2009 Low et al. ..................... 345/107
2010/0194789 A1 * 8/2010 Lin et al. ....................... 345/690
2011/0001748 A1 * 1/2011 Rutman et al. ................ 345/214
2011/0187766 A1 8/2011 Yamada

FOREIGN PATENT DOCUMENTS

JP 2009-251615 A 10/2009
JP 2011-158720 A 8/2011

* cited by examiner

*Primary Examiner* — Dwayne Bost
*Assistant Examiner* — Darlene M Ritchie
(74) *Attorney, Agent, or Firm* — ALG Intellectual Property, LLC

(57) ABSTRACT

A control device includes a writing device that writes an image according to image data, through a plurality of frame periods, to a plurality of pixels that compose a display section, and a refresh processing device that performs refreshing a group of pixels that is subject to refreshing among the plurality of pixels when a value concerning the number of times of image writing performed by the writing device since the last refreshing is equal to or greater than a threshold value. While the refresh processing device is performing refreshing, the writing device does not perform image writing with respect to the group of pixels that is subject to the refreshing, but performs image writing with respect to a group of pixels that is not subject to the refreshing.

6 Claims, 30 Drawing Sheets

CONTROL DEVICE, DISPLAY DEVICE AND METHOD FOR CONTROLLING DISPLAY DEVICE

BACKGROUND

1. Technical Field

The present invention relates to control devices, display devices and methods for controlling a display device.

2. Related Art

Among electrophoretic type display devices, there is a type that performs each rewriting operation by applying voltages multiple times. Such a rewriting operation may be performed when it takes a relatively long time for display elements to change their display state (i.e., gradation). When such a rewriting operation is performed, unless one rewriting operation is completed (in other words, unless the time for multiple voltage applications has elapsed), the next rewriting operation cannot be started.

Japanese Laid-open Patent Application JP-A-2009-251615 (Patent Document) describes a technology for rewriting an image at each of divided regions by a pipeline processing in a display device such as an electrophoretic display device or the like. By using such a method, a rewriting operation can be started on a region where rewriting is not performed, without depending on the rewriting state of other regions, such that the time required for rewriting may be made shorter, compared to the case where the entire image is rewritten at once.

Incidentally, in an area of the electrophoretic display device where rewriting is performed a plurality of times, an afterimage of the image may remain due to operation failure of the electrophoretic particles. In order to erase such an afterimage, the entire target area is displayed in black or the entire target area is displayed in white, a so-called refreshing operation may be performed. However, according to the technology described in the Patent Document, partial refreshing is not described, but refreshing is performed over the entire display area. Therefore, while refreshing is performed, other rewriting operations are stopped.

SUMMARY

In accordance with an advantage of some aspects of the invention, a display device is capable of rewriting operation in areas that are not subject to refreshing, without depending on an ongoing refreshing operation in another area that is subject to refreshing.

In accordance with an embodiment of the invention, a control device includes a writing device that writes an image according to image data to a plurality of pixels that compose a display section, a specifying device that specifies a group of pixels that is subject to refreshing among the plurality of pixels, and a refresh processing device that performs refreshing with respect to the group of pixels when a value concerning the number of times of image writing performed by the writing device with respect to the group of pixels specified by the specifying device since the last refreshing is equal to or greater than a threshold value. While the refresh processing device is performing refreshing, the writing device does not perform image writing with respect to the group of pixels that is subject to the refreshing, but performs image writing with respect to a group of pixels that is not subject to the refreshing. According to the control device described above, the display device can perform, without depending on a refreshing process that is in progress in another area that is subject to refreshing, a rewriting process in an area that is not subject to the refreshing.

In accordance with an aspect of the embodiment, each of the plurality of pixels may assume one of a plurality of display states including at least a first display state and a second display state by the writing device, and the value concerning the number of times of image writing may be the number of times of writing that is performed with respect to at least one pixel among the group of pixels specified by the specifying device from the first display state to the second display state, and the number of times of writing that is performed with respect to at least one pixel among the group of pixels specified by the specifying device from the second display state to the first display state. According to the aspect described above, the refreshing period can be limited to moments when there is a higher possibility that the visibility at the display section lowers.

In accordance with another aspect of the embodiment, each of the plurality of pixels may assume one of a plurality of display states including at least a first display state and a second display state by writing performed by the writing device, and the value concerning the number of times of image writing may be the number of pixels with which writing is performed among the group of pixels specified by the specifying device from the first display state to the second display state, and the number of pixels with which writing is performed among the group of pixels specified by the specifying device from the second display state to the first display state. According to the aspect described above, refreshing can be performed at the timing when the number of times of scheduled rewriting in the unit of a pixel becomes equal to or greater than a threshold value, in other words, at the timing when there is a higher possibility that the visibility at the display section lowers.

In accordance with still another aspect of the embodiment, each of the plurality of pixels may assume one of a plurality of display states including at least a first display state and a second display state by writing performed by the writing device, and the value concerning the number of times of image writing may be the number of pixels with which writing is performed among the group of pixels specified by the specifying device from the first display state to the second display state, the number of pixels with which writing is performed among the group of pixels specified by the specifying device from the second display state to the first display state, the number of pixels with which writing is performed among the group of pixels specified by the specifying device from the first display state to the first display state, and the number of pixels with which writing is performed among the group of pixels specified by the specifying device from the second display state to the second display state. According to the aspect described above, refreshing can also be performed at the timing when there is a higher possibility that the visibility at the display section lowers.

In accordance with yet another aspect of the embodiment of the invention, the writing device may include a rewrite judging device that judges as to whether or not a new write instruction occurs with respect to one pixel of the plurality of pixels, a write state judging device that judges, when it is judged that the new write instruction occurs, as to whether or not an image write operation is in progress with respect to the one pixel, and a write control device. The write control device stores, when the write state judging device judges that a write operation is not in progress with respect to the one pixel, first write data indicative of the number of times of drive voltage application to change the display state of the pixel from the first display state to the second display state, or second write data indicative of the number of times of drive voltage application to change the display state of the pixel from the second display state to the first display state in a first memory region, and performs a write control of applying a drive voltage a plurality of times to the one pixel based on the first write data or the second write data stored in the first memory region. On the other hand, when the write state judging device judges that a write operation is in progress with respect to the one pixel, the write control device may continue the write operation in progress, and performs the write control upon completion of the write operation. According to the aspect of the embodiment, in an area that is not subject to refreshing, when a new write instruction occurs for any one of the pixels, and if a rewrite operation of the pixel is not in progress, writing is started. If a rewrite operation of the pixel is in progress, the rewrite operation can be continued.

Also, in accordance with another embodiment of the invention, a display device is equipped with any one of the control devices described above. According to the display device, display of an image can be proceeded in regions other than a region that is subject to refreshing, such that an apparent response speed up to a moment of recognizing contents of an image is improved, compared to a display device that performs a refreshing operation of displaying pixels in the entire area in the same color.

Furthermore, another embodiment of the invention pertains to a control method for a display device equipped with a display section composed of a plurality of pixels. The control method includes a specifying step of specifying a group of pixels that is subject to refreshing among the plurality of pixels, a refresh processing step of refreshing the group of pixels when the number of times of image writing according to image data with respect to the group of pixels specified by the specifying step since the last refreshing is equal to or greater than a threshold value, and a writing step of, while the refresh processing step is performing refreshing, not performing image writing according to image data with respect to the group of pixels that is subject to the refreshing, but performing image writing according to image data with respect to a group of pixels that is not subject to the refreshing. According to the control method described above, it is possible for a display device to perform refreshing in an area that is subject to refreshing, without depending on an image writing process that is in progress in an area that is not subject to refreshing.

DESCRIPTION OF EXEMPLARY EMBODIMENTS

First Embodiment

A first embodiment of the invention will be described below.

Configuration of Display Device 100

Figure 1:
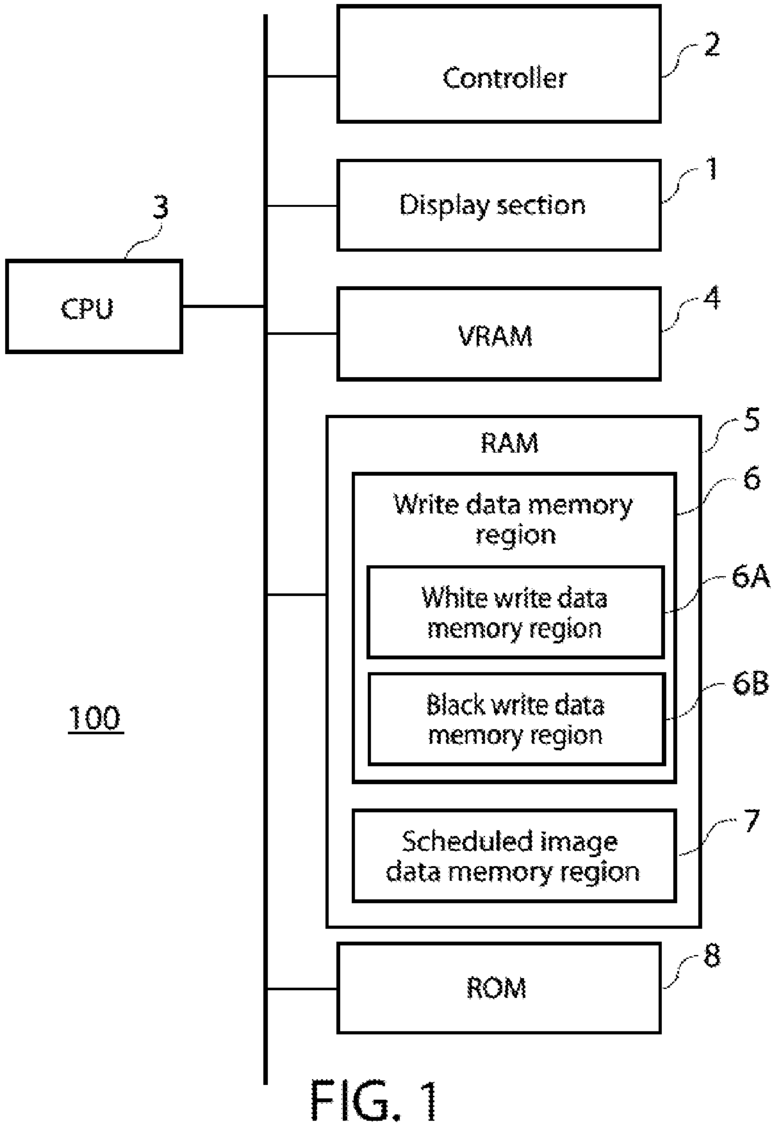
FIG. 1 is a block diagram showing a hardware configuration of an electrophoretic display device 100.

FIG. 1 is a block diagram showing a hardware configuration of an electrophoretic display device 100 in accordance with a first embodiment of the invention. As shown in FIG. 1, the electrophoretic display device 100 is equipped with a display section 1, a controller 2, a central processing unit (CPU) 3, a video RAM (VRAM) 4, and a random access memory (RAM) 5 and a ROM 8. The sections are mutually connected through a bus. The controller 2 corresponds to a control device of the electrophoretic display device 100. It is noted that a portion including the controller 2 and the CPU 3 combined may be defined as a control device for the electrophoretic display device 100. Alternatively, the entirety of the controller 2, the CPU 3, the VRAM 4, the RAM 5 and the ROM 8 may be defined as a control device for the electrophoretic display device 100.

The display section 1 is a display device that has display elements having memory retaining property, and maintains a display state even when writing is not performed. In accordance with the first embodiment, the display section 1 is an electrophoretic type image display device equipped with electrophoretic elements as display elements having memory property, and includes a plurality of scanning lines, a plurality of data lines, and a plurality of pixels. For changing the display state of each of the pixels from, for example, black (a first display state) to white (a second display state), it is necessary to apply a drive voltage a plurality of times (seven times in accordance with the first embodiment) to each of the pixels. Similarly, for changing the display state of each of the pixels from white (a first display state) to black (a second display state), it is necessary to apply a drive voltage a plurality of times (seven times in accordance with the first embodiment) to each of the pixels.

The controller 2 outputs image signals indicative of images to be displayed on the display section 1 and various kinds of other signals (clock signals and the like). The CPU 3 is a processor that controls the operation of the electrophoretic display device 100 and, in particular, controls to store image data to be displayed on the display section 1 in the VRAM 4. The VRAM (a second memory region) 4 is a frame buffer, and stores image data to be displayed on the display section 1 based on the control by the CPU 3. It is noted that image data here is indicative of data that represents an image composed of an aggregation of the entire pixels to be displayed on the display section 1. Also, in the description to be made below concerning each memory region, a nomenclature "image data" is used to refer to data corresponding to an aggregation of the entire pixels, for the sake of convenience, and does not refer to data corresponding to one pixel.

The RAM 5 includes a write data memory region (a first memory region) 6, and a scheduled image data memory region (a third memory region) 7. The write data memory region 6 stores contents to be written based on image data stored in the VRAM 4. The controller 2 refers to the write data memory region 6, and applies drive voltages to the respective pixels in the display section based on the referred contents stored in the write data memory region 6. The scheduled image data memory region 7 stores image data scheduled (scheduled image data) to be displayed on the display section 1 when writing to be performed for each of the pixels based on the contents stored in the write data memory region 6 is completed. In the following description, data stored in each of the memory regions, for each pixel or a memory region corresponding to a pixel, is called pixel data. The ROM 8 stores a program and the like for controlling each of the sections of the electrophoretic display device 100.

Configuration of Display Section 1

Figure 2:
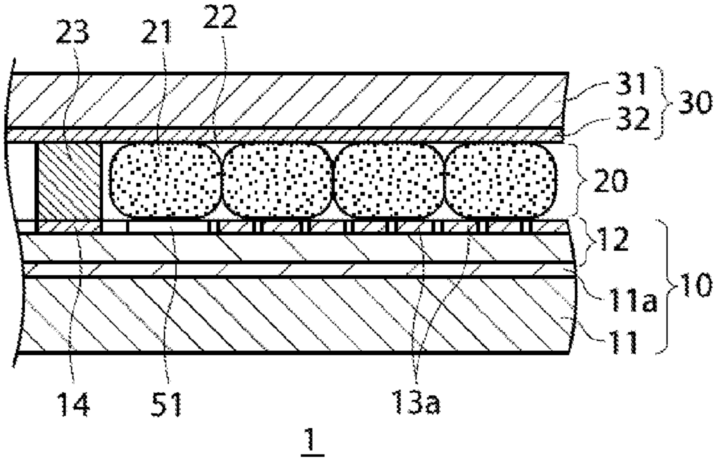
FIG. 2 is a cross-sectional view of a display section 1.

A detailed configuration of the display section 1 will be described with reference to FIGS. 2-4. FIG. 2 is a cross-sectional view of the display section 1. As shown in the figure, the display section 1 is formed generally from a first substrate 10, an electrophoretic layer 20, and a second substrate 30. The first substrate 10 includes a flexible substrate 11 that serves as a dielectric base substrate for forming an electric circuit thereon and a thin film semiconductor circuit layer 12 formed on the flexible substrate 11. The substrate 11 is made of, for example, a polycarbonate substrate. The thin film semiconductor circuit layer 12 is laminated over the flexible substrate 11 through an adhesive layer 11*a*. It is noted that the flexible substrate 11 may be made of any resin material that is lightweight and exceeds in flexibility and elasticity. In place of the flexible substrate 11, a glass substrate that does not have flexibility may be used. In this case, the thin film semiconductor circuit layer 12 is formed on the substrate without placing an adhesive layer therebetween.

The thin film semiconductor circuit layer 12 is formed from a group of plural wirings arranged in a row direction and a column direction, a pixel electrode group, pixel drive circuits, connection terminals, a row decoder 51 and a column decoder (not shown) for selecting pixels to be driven, and the like. The pixel drive circuits are configured with circuit elements such as thin film transistors (TFTs) or the like. The pixel electrode group includes a plurality of pixel electrodes 13*a* that are arranged in a matrix configuration, and forms an image display area. The thin film semiconductor circuit layer 12 is formed with an active matrix circuit that is capable of applying individual drive voltages to the respective pixel electrodes 13*a*. Connection electrodes 14 electrically connect a transparent electrode layer 32 of the second substrate 30 with the circuit wirings on the first substrate 10, and are formed at an outer circumferential portion of the thin film semiconductor circuit layer 12.

The electrophoretic layer 20 is formed over the pixel electrodes 13*a* and their circumferential areas. The electrophoretic layer 20 includes numerous microcapsules 21 fixed by a binder 22. The microcapsules 21 each contain an electrophoretic dispersion medium and electrophoretic particles. An adhesive layer may be further provided between the microcapsules 21 fixed by the binder 22 and the pixel electrodes 13*a*. The electrophoretic particles have a property in which they move in the electrophoretic dispersion medium according to an applied voltage, and may be composed of one or more types (two types in this embodiment) of electrophoretic particles. The electrophoretic layer 20 may be formed through mixing the microcapsules 21 described above in the binder together with a desired dielectric constant adjusting agent, and coating the mixture on the obtained resin-composed substrate by a known coating method.

As the electrophoretic dispersion medium, it is possible to use any one of materials including water; alcohol solvents (such as, methanol, ethanol, isopropanol, butanol, octanol, and methyl cellosolve); esters (such as, ethyl acetate and butyl acetate); ketones (such as, acetone, methyl ethyl ketone, and methyl isobutyl ketone); aliphatic hydrocarbons (such as, pentane, hexane, and octane); alicyclic hydrocarbons (such as, cyclohexane and methylcyclohexane); aromatic hydrocarbons (such as, benzene, toluene, long-chain alkyl group-containing benzenes (such as, xylenes, hexylbenzene, heptylbenzene, octylbenzene, nonylbenzene, decylbenzene, undecylbenzene, dodecylbenzene, tridecylbenzene, and tetradecylbenzene); halogenated hydrocarbons (such as, methylene chloride, chloroform, carbon tetrachloride, and 1,2-dichloroethane); and carboxylates. Also, the dispersion medium may be made of any one of other various oils. The dispersion medium may use any of the materials described above alone or in combination, and may be further mixed with a surfactant.

The electrophoretic particles are particles (polymer or colloid) having a property in which the particles electrophoretically move in the electrophoretic dispersion medium to a desired electrode side by a potential difference. As the electrophoretic particles, black pigments, such as, for example, aniline black, carbon black and the like, white pigment, such as, for example, titanium dioxide, aluminum oxide and the like may be used. In addition, yellow pigments, red pigments and blue pigments may also be used. The aforementioned particles may be used alone, or two or more types may be used in combination. In accordance with the first embodiment, as the electrophoretic particles, positively charged black particles and negatively charged white particles are used. It goes without saying that negatively charged black particles and positively charged white particles may also be used.

The microcapsules 21 may preferably be composed of a material having flexibility, such as, composites of gum arabic and gelatin, urethane compounds, and the like. The binder 22 may be made of any material that has good affinity with the microcapsules 21, excellent adhesion to the electrodes, and dielectric property, without any particular limitation.

The second substrate 30 is formed from a thin film 31 and a transparent electrode layer 32 formed on the bottom surface of the film 31, and is formed in a manner to cover the electrophoretic layer 20. The transparent electrode layer 32 is a common electrode arranged opposite to the plurality of pixel electrodes 13a. The thin film 31 plays a role of sealing and protecting the electrophoretic layer 20, and may be made of, for example, a polyethylene terephthalate (PET) film. The thin film 31 is made of a dielectric, transparent material. The transparent electrode layer 32 may be made of a transparent conductive film, such as, for example, an indium oxide film (ITO film) doped with tin. The circuit wirings on the first substrate 10 and the transparent electrode layer 32 on the second substrate 30 are mutually connected outside of the forming area of the electrophoretic layer 20. More specifically, the transparent electrode layer 32 and the connection electrodes 14 of the thin film semiconductor circuit layer 12 are connected with each other through conductive connection members 23.

Figure 3:
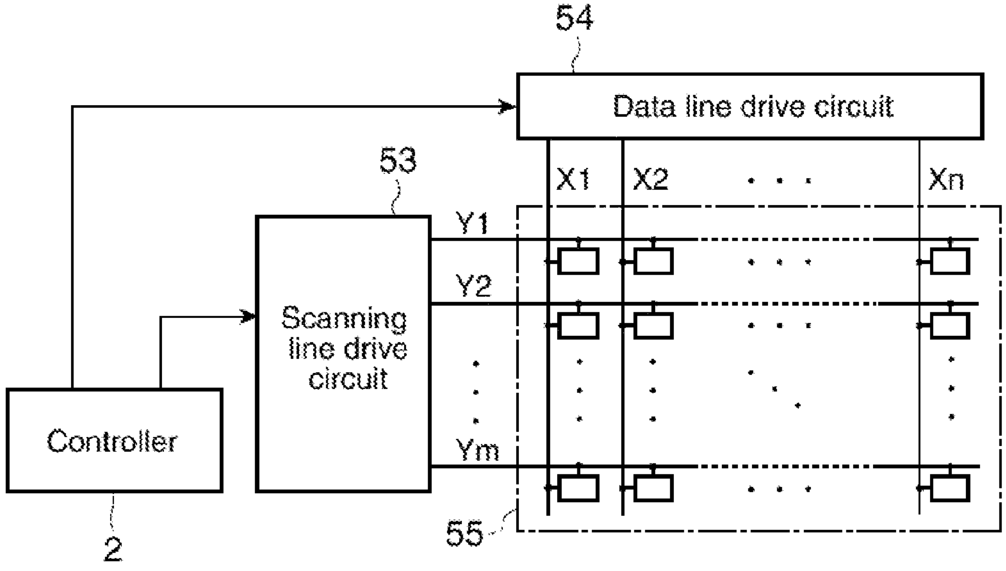
FIG. 3 is a schematic diagram for describing a circuit configuration of the display section 1.

FIG. 3 is a schematic diagram of the circuit configuration of the display section 1. The controller 2 generates image signals indicative of an image to be displayed in an image display region 55, reset data for performing reset operations at the time of image rewriting operations, refresh data for performing an all-black display process and an all-white display process (refreshing) for pixels included in a specified partial display area in the image display region 55, and other various types of signals (clock signals and the like), and outputs these signals to the scanning line drive circuit 53 or the data line drive circuit 54. In this embodiment, the all-black display means displaying the entire pixels included in a target area in black, and the all-white display means display the entire pixels included in a target area in white. The image display region 55 is provided with a plurality of data lines arranged in parallel with the X direction, a plurality of scanning lines arranged in parallel with the Y direction, and pixel drive circuits arranged at intersections of these data lines and the scanning lines.

Figure 4:
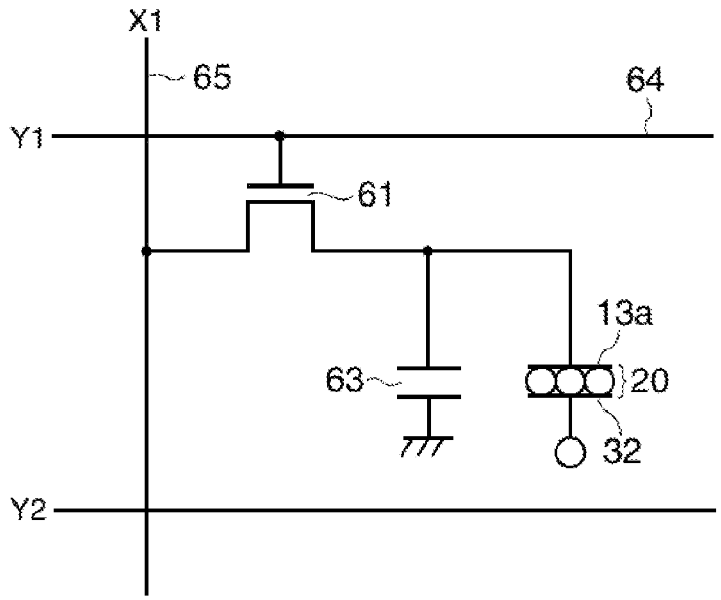
FIG. 4 is a diagram for describing a configuration of a pixel driving circuit of the display section 1.

FIG. 4 is a diagram for describing the configuration of the pixel drive circuit of the display section 1. It is noted that, in accordance with the first embodiment, in order to distinguish the scanning lines 64 one from the other, the scanning lines shown in FIG. 3 may be called sequentially, from the top, as the scanning lines in the $1^{st}$ row, the $2^{nd}$ row, the $3^{rd}$ row, the (m−1)-th row, and the m-th row. Similarly, in order to distinguish the data lines 65 one from the other, the data lines shown in FIG. 3 may be called sequentially, from the left, as the data lines in the $1^{st}$ column, the $2^{nd}$ column, the $3^{rd}$ column, the (n−1)-th column, and the n-th column.

FIG. 4 shows a pixel drive circuit corresponding to an intersection between the scanning line 64 in the first row and the data line 65 in the first column. The same pixel drive circuits are provided at other intersections between the data lines 65 and the scanning lines 64, and each of the pixel drive circuits has the same configuration. Therefore, the pixel drive circuit corresponding to an intersection between the scanning line 64 in the first row and the data line 65 in the first column is described below as a representative pixel drive circuit, and description of the other pixel drive circuits is omitted.

The pixel drive circuit has a transistor 61 having a gate connected to the scanning line 64. A source of the transistor 61 is connected to the data line, and a drain of the transistor 61 is connected to the pixel electrode 13*a*. The pixel electrode 13*a* is disposed opposite to the transparent electrode layer 32, and the electrophoretic layer 20 is sandwiched between the pixel electrode 13*a* and the transparent electrode layer 32. The microcapsule 21 that is present between one pixel electrode 13*a* and the transparent electrode layer 32 defines one of the pixels in the display section 1. In the pixel drive circuit, a retention capacitance 63 is connected in parallel with the electrophoretic layer 20. Also, the potential on the transparent electrode layer 32 is set at a predetermined potential Vcom.

A scanning line drive circuit 53 is connected to each of the scanning lines 64 of the display region 55, and supplies scanning signals Y1, Y2, . . . , Ym to the scanning lines 64 in the $1^{st}$ row, the $2^{nd}$ row, . . . , the m-th row, respectively. More specifically, the scanning line drive circuit 53 sequentially selects the scanning lines 64 from the $1^{st}$, the $2^{nd}$, . . . to the m-th row, in this order, and provides a scanning signal with a selected voltage $V_H$ (H level) to selected ones of the scanning lines 64, and a scanning signal with a non-selected voltage $V_L$ (L level) to non-selected ones of the scanning lines.

A data line drive circuit 54 is connected to each of the data lines in the display region, and supplies data signals X1, X2, . . . , Xn to the data lines 65 in the $1^{st}$ column, the $2^{nd}$ column, and the n-th column, respectively. A data signal is supplied from the data lines 65 to the pixel drive circuits connected to the scanning lines 64 whose potential is at the selected potential $V_H$. More specifically, when the scanning line 64 is at H level, the transistors 61 having the gates connected to the scanning line 64 turn on, and the pixel electrodes 13*a* are connected to the data lines 65. Therefore, by supplying a data signal to the data lines 65 when the scanning line 64 is at H level, the data signal is applied to the pixel electrodes 13*a* through the transistors 61 that are turned on. When the scanning line 64 turns to L level, the transistors 61 are turned off. However, the voltage applied to the pixel electrodes 13*a* by the data signal is stored in the retaining capacitances 63, whereby the electrophoretic particles move according to a potential difference (a voltage) between the potential on the pixel electrodes 13*a* and the potential on the transparent electrode layer 32. For example, when the potential on the pixel electrodes 13*a* is +15V with respect to the potential Vcom on the transparent electrode layer 32, the negatively charged white electrophoretic particles move toward the pixel electrode 13*a*, and the positively charged black electrophoretic particles move toward the transparent electrode layer 32, such that the pixels exhibit a black display. When the potential on the pixel electrodes 13*a* is −15V with respect to the potential Vcom on the transparent electrode layer 32, the positively charged black electrophoretic particles move toward the pixel electrodes 13*a*, and the negatively charged white electrophoretic particles move toward the transparent electrode layer 32, such that the pixels exhibit a white display.

In the following description, a period starting from the selection of the scanning line in the first row by the scanning line drive circuit 53 until the completion of the selection of the scanning line in the Y-th row is referred to as a "frame period" or, simply a "frame." Each of the scanning lines 64 is selected once in each frame, and a data signal is supplied to each of the pixel drive circuits once in each frame. Also, in accordance with the first embodiment, when the display state of each of the pixels is changed from white (low density) to black (high density) or from black to white, the display state is not changed only in one frame by driving the pixel drive circuit. Instead, the display state is changed by a write operation in which voltages are applied to the pixels through a plurality of frames. For example, when changing the display state of pixels from white to black, data signals for causing the pixels to present a black color are supplied to the pixel drive circuits through a plurality of frames; and when changing the display state of pixels from black to white, data signals for causing the pixels to present a white color are supplied across a plurality of frames.

Next, the write data memory region 6 is described in detail. The write data memory region 6 is provided with a white write data memory region 6A that stores data, for each of the pixels, indicative of whether or not an operation of changing the display state of the pixel from black (a first display state) to white (a second display state) is in progress (first write data), and a black write data memory region 6B that stores data, for each of the pixels, indicative of whether or not an operation of changing the display state of the pixel from white to black is in progress (second write data).

The first write data and the second write data are values that change according to the number of times a drive voltage has already been applied in a write operation. Upon application of the last drive voltage in the writing, the write data assumes a value indicating that the write operation with respect to one pixel is not in progress. In the present embodiment, the write data indicates the number of times of remaining voltage application until the completion of a writing operation. Accordingly, in this embodiment, the number of times of remaining voltage application "0" indicates that a rewriting operation is not in progress, and a value "other than 0" indicates that a rewriting operation is in progress.

Configuration of Controller 2

Figure 5:
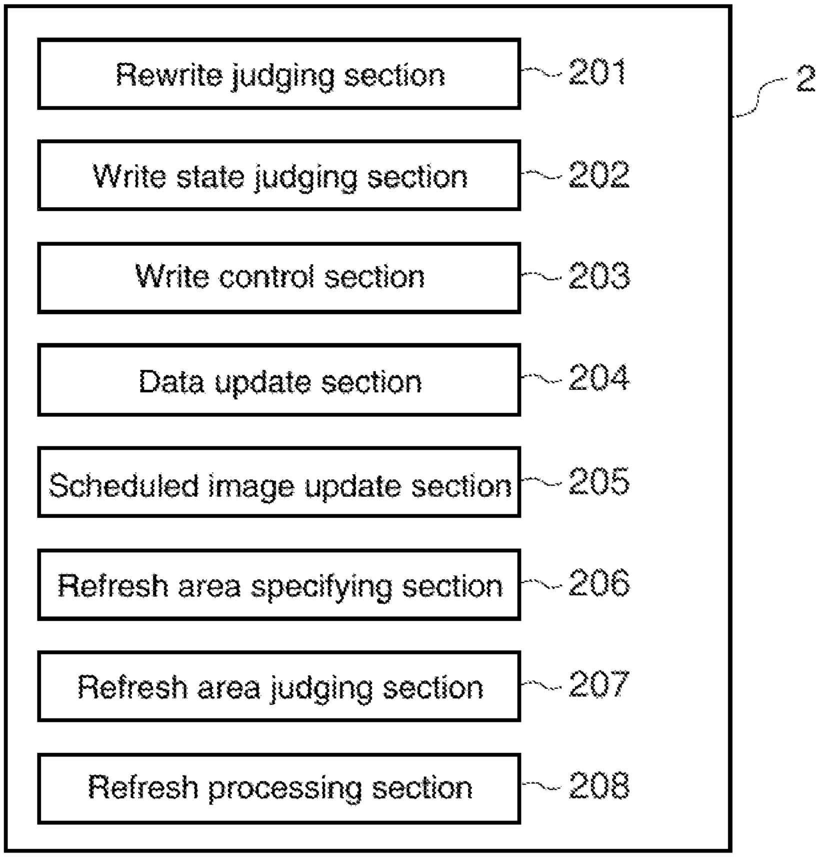
FIG. 5 is a block diagram of a functional configuration realized by a controller 2.

FIG. 5 is a block diagram showing a configuration of functions to be realized by the controller 2. As shown in FIG. 5, the controller 2 is equipped with a rewrite judging section 201, a write state judging section 202, a write control section 203, a data update section 204, a scheduled image update section 205, a refresh area specifying section 206, a refresh judging section 207, and a refresh processing section 208. It is noted that the rewrite judging section 201, the write state judging section 202, the write control section 203, the data update section 204, the scheduled image update section 205, the refresh area specifying section 206, the refresh judging section 207, and the refresh processing section 208 correspond to functions that are realized by a program executed by the processor of the controller 2.

The rewrite judging section 201 judges as to whether or not a new write instruction for a pixel has occurred. More specifically, first, the rewrite judging section 201 compares, for a pixel, pixel data of a display image stored in the VRAM 4 and pixel data of a scheduled image store in the scheduled image data memory region 7. Then, the rewrite judging section 201 judges based on the comparison result as to whether or not the scheduled image data memory region 7 needs to be updated, and whether or not a new write event occurs to the pixel. Here, as the pixel data of a display image stored in the VRAM 4 is the latest information, if the pixel data of the display image does not match with the pixel data of the scheduled image, it means that it has been instructed to display an image with content different from that of the scheduled image. In other words, when the pixel data of the display image does not match with the pixel data of the scheduled image, there is a situation in which a new write instruction occurs for the pixel, or a situation in which a new write occurs to the pixel, and therefore the content in the scheduled image data memory region 7 also needs to be updated. In this manner, the rewrite judging section 201 functions as an example of a rewrite judging device that judges as to whether or not a new write instruction has occurred for a pixel among the plurality of pixels.

The write state judging section 202 refers, for a pixel, to the write content stored in the write data memory region 7, and judges as to whether or not a write operation is in progress. In other words, the write state judging section 202 functions as an example of a write state judging device that judges as to whether or not an image write operation for the pixel is in progress, when it is judged that a new write instruction occurs. The write control section 203 controls the scanning line drive circuit 53 and the data line drive circuit 54 based on the judgment result of the write state judging section 202 such that data signals are supplied to the pixel electrodes 13*a*. In other words, the write control section 203 functions as an example of a write device that writes an image according to image data to the plurality of pixels composing the display section. The data update section 204 writes the write data to the white write data memory region 6A and the black write data memory region 6B. The scheduled image update section 205 updates the scheduled image data stored in the scheduled image data memory region 7 with image data to be given when the write control section 203 has completely finished the writing according to write contents stored in the write data memory region 6.

Prior to starting the description of the refresh area specifying section 206, refreshing is described. As described above, refreshing is the process of rendering an all-black display or an all-white display on pixels in a specified display area in the image display region 55. This process is performed because of the following reason.

When operations of rewriting from white to black and rewriting from black to white are repeated, the electrophoretic display device 100 may exhibit a state in which the black or white electrophoretic particles do not completely migrate to the display side (the side viewed from the observer) or the side of the pixel electrodes 13*a* even by application of potential differences to the pixel electrodes 13*a* a predetermined number of times according to given image data. In this case, a display area that is supposed to display white according to given potential differences may have black particles remaining on the display side, such that the gradation of an image that is supposed to be displayed on the display section 1 is not attained according to the image data, causing disturbance in the image and lowering the visibility. On the other hand, a display area that is supposed to display black may have white particles remaining on the display side, such that the visibility may likewise be lowered. Refreshing is a process performed to solve the problems described above. In other words, refreshing is a process of approximating the gradation of an image to be displayed on the display section to the gradation specified in image data. More specifically, refreshing is performed through repeating a process of voltage application once or a plurality of times to a group of pixels that is subject to refreshing such that the entire area of the group of pixels has the same gradation. In particular, when the voltage application process is repeated a plurality of times, gradations of the pixel group may desirably made different from one another in each of the voltage application processes.

The refreshing operation in accordance with the present embodiment is performed as follows. The refresh processing section 208 applies, to pixel electrodes 13*a* included in a designated display region, a positive drive voltage with respect to the potential Vcom on the transparent electrode layer 32 through frames in a number necessary for rewriting from white to black. Thereafter, the refresh processing section 208 applies, to the pixel electrodes 13*a*, a negative drive voltage with respect to the potential Vcom of the transparent electrode layer 32 through frames in a number necessary for rewriting from black to white. In other words, in accordance with the present embodiment, the voltage application process to write black on the entire area that is subject to refreshing is performed, and then the voltage application process to write white on the entire area that is subject to refreshing is performed. In this manner, the processes for all-black display and all-white display are executed in a designated display area, whereby electrophoretic particles remaining on the display side migrate to the side of the pixel electrodes 13*a*. As a result, the visibility that is reduced is restored.

The refresh area specifying section 206 specifies an area composed of pixels to be refreshed (a refresh area) among the display image region 55, and stores the location of the specified refresh area in the RAM 5. The refresh area is defined by a rectangle. According to the first embodiment, the refresh area specifying section 206 receives, from the CPU 3, position information indicative of positions of mutually diagonally located two pixels (for example, at the left upper corner and the right lower corner as viewed from directly above the display section 1) among four pixels located at the corners of a rectangular area that is to be refreshed among the image display region 55. Then, the refresh area specifying section 206 specifies a rectangular refresh area based on the position information. The rectangular area that is to be refreshed may be typically an area corresponding to a text input box where rewriting is frequently performed by the user. It is noted that the position information given by the CPU 3 to the refresh area specifying section 206 is not limited to position information concerning one rectangle. For example, if image data to be displayed on the display section 1 includes a plurality of areas corresponding to text input boxes, the CPU 3 sends the position information for each of the rectangles representing the respective areas to the refresh area specifying section 206. In this manner, the refresh area specifying section 206 functions as an example of a specifying device that specifies a group of pixels that is subject to refreshing among multiple pixels.

The refresh judging section 207 judges as to whether or not a refresh area should be refreshed. More specifically, the refresh judging section 207 counts the number of frames for the refresh area where writing has been performed and stores the count in the RAM 5. Hereafter, the count of the number of frames where writing has been performed for the refresh area will be simply called the frame number count. When the frame number count becomes equal to or greater than a predetermined threshold value stored in the ROM 8, the refresh judging section 207 judges that refreshing should be performed, and notifies the refresh processing section 208 of the result. In other words, the frame number count is a value concerning the number of writing operations, and is an example of the number of times writing is performed from the first display state to the second display state for at least one pixel among the group of pixels specified by the specifying device, or an example of the number of times writing is performed from the second display state to the first display state for at least one pixel among the group of pixels specified by the specifying device.

The refresh processing section 208, upon receiving the notification to perform refreshing from the refresh judging section 207, occupies a refreshing area thereby blocking the access by the write control section 203, and overwrites the refresh flag stored in the RAM 5 indicating as to whether or not refreshing is in progress with 1 that indicates that refreshing is in progress. It is noted that a refresh flag "0" means that refreshing is not in progress. Then, the refresh processing section 208 performs the refreshing of the refresh area. At this time, the refresh processing section 208 performs the refreshing of the refresh area, in parallel with the write operation performed by the write control section 203 in display areas other than the refresh area. The refresh processing section 208 releases the occupied refresh area when the refreshing is completed, and overwrites the refresh flag with 0. In this manner, the refresh judging section 207 and the refresh processing section 208 function as an example of a refresh processing device that performs refreshing of a group of pixels specified by the specifying device when the value concerning the number of times of image writing performed by the write device for the group of pixels since the last refreshing is equal to or greater than a threshold value.

Operation of First Embodiment

Next, the operation of the electrophoretic display device 100 is described with reference to FIGS. 6-26. It is noted that, in FIG. 8-FIG. 26, an image A represents an image displayed on the display section 1. A pixel Pij represents one pixel. Here, the index i represents a row number of the pixels arranged in a matrix of rows and columns, and the index j presents a column number of the pixel. When pixels are specified in the following description, the indexes are used as follows. For example, a pixel in the first row and in the first column is referred to as a pixel P11. In the image A, each of the pixels is appended with a number between 0 and 7 that indicate respectively eight levels of gradation from black to white in order to readily understand the gradation of each of the pixels. However, these numbers are not actually displayed in the display section 1. Also, in the display section 1, the pixels are present respectively at all the intersections of the m scanning lines 64 and the n data lines 65. However, in order to avoid complexity in the drawings, FIGS. 8-26 show pixels P11-P44 in a matrix of 4 rows and 4 columns in a portion of the display section 1.

Also, FIGS. 8-26 show contents of the memory region Aij in the VRAM 4 corresponding to the pixels P11-P44, contents of the memory region Bij in the scheduled image data memory region 7 corresponding to the pixels P11-P44, contents of the memory region Cij in the white write data memory region 6A corresponding to the pixels P11-P44, and contents of the memory region Dij in the black write data memory region 6B corresponding to the pixels P11-P44. It is noted that the index i appended with each of the memory regions represents a row number of the memory region arranged in a matrix, and the index j represents a column number thereof. For example, for specifying a memory region for description, for example, a memory region Aij in the first row and in the first column is referred to as a memory region A11.

The memory regions A11-A44 of the VRAM 4 store levels of gradation of the respective corresponding pixels of the image displayed on the display section 1, and the memory regions B11-B44 of the scheduled image data memory region 7 stores levels of gradation of the respective corresponding pixels of an image scheduled to be displayed on the display section 1. The memory regions C11-C44 of the white write data memory region 6A each store the number of times of voltage application necessary to turn the pixels P11-P44 to white as first write data, respectively. The memory regions D11-D44 of the black write data memory region 6B each store the number of times of voltage application necessary to turn the pixels P11-P44 to black as second write data, respectively. The first write data and the second write data, when they are not 0, indicate that a rewriting operation to pixels is in progress. On the other hand, when they are 0, they indicate that a rewriting operation to pixels has been completed.

Figure 6:
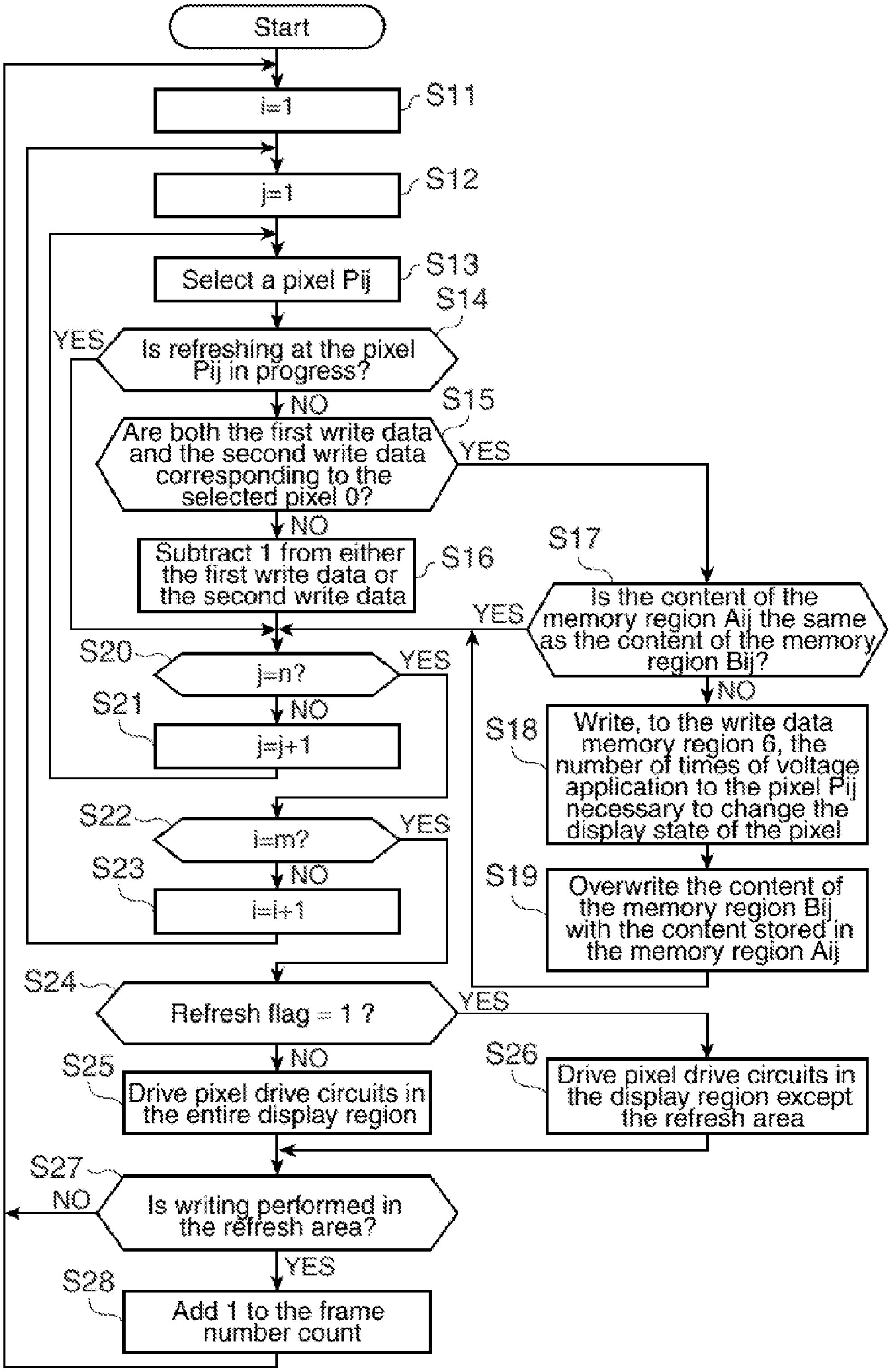
FIG. 6 is a flow chart of processes performed by the controller 2 in accordance with a first embodiment.
Figure 7A:
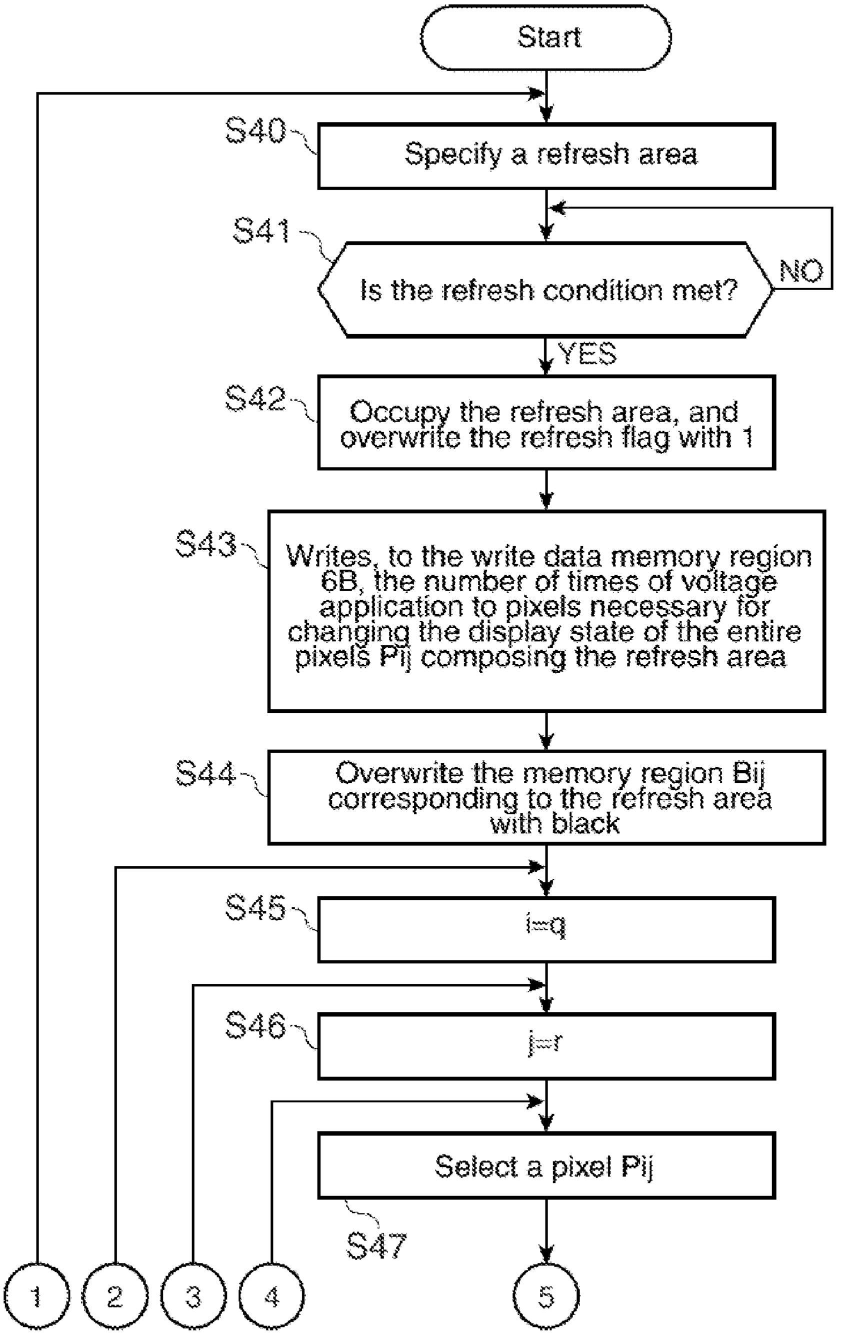
FIG. 7A is a flow chart of a refresh process.
Figure 7B:
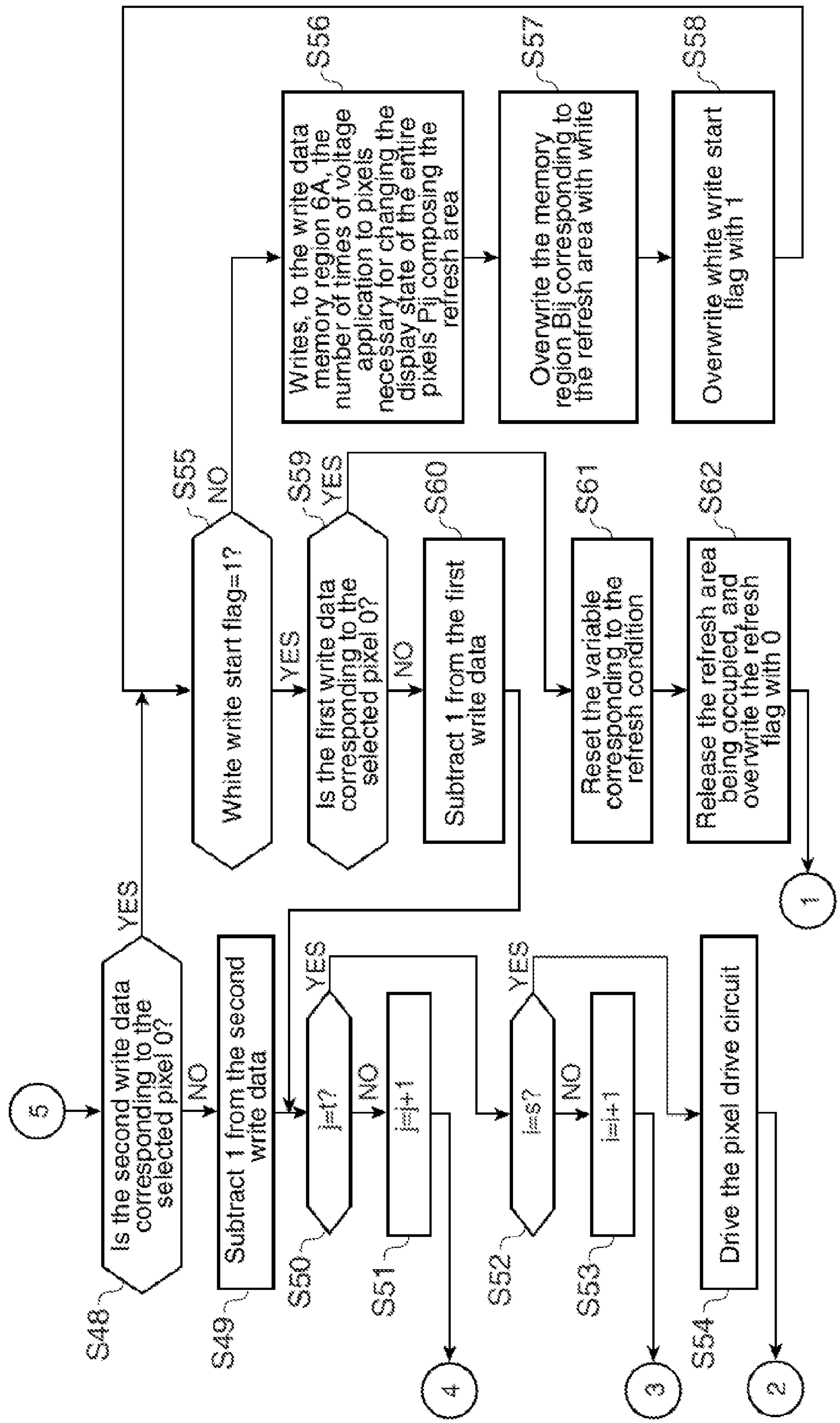
FIG. 7B is a flow chart of the refresh process.

When driving pixels, the controller 2 executes processes along flow charts shown in FIGS. 6 and 7. FIG. 6 is a flow chart of processes performed by the controller 2 in accordance with the first embodiment. FIGS. 7A and 7B are flow charts of the refreshing process. It is noted that the process flow shown in FIG. 6 and the process flows shown in FIGS. 7A and 7B are performed in parallel. First, the flow chart shown in FIG. 6 will be described.

First, the write state judging section 202 initializes values of the variables i and j to 1 (steps S11 and S12). Next, the write state judging section 202 selects a pixel Pij specified by the variables i and j (step S13). For example, when the value of the variable i is 1 and the value of the variable j is 1, a pixel P11 is selected. Next, the write control section 203 judges as to whether or not refreshing is in progress at the selected pixel Pij (step S14). More specifically, step S14 judges that refreshing is in progress, when the pixel Pij is included in a refresh area and when the refresh flag is 1, and judges that refreshing is not in progress when the two conditions are not met. When refreshing is in progress at the selected pixel Pij (step S14; YES), the process proceeds to step S20. When refreshing is not in progress at the selected pixel Pij (step S14; NO), the write state judging section 202 judges as to whether or not the first write data stored in the memory region Cij and the second write data stored in the memory region Dij corresponding to the selected pixel Pij are both 0 (step S15). When the write state judging section 202 judges that the first write data stored in the memory region Cij and the second write data stored in the memory region Dij corresponding to the selected pixel Pij are both 0 (step S15; YES), the process proceeds to step S17. When one of the first write data and the second write data is other than 0 (step S15; NO), the process proceeds to step S16. In step S16, the data update section 204 subtracts 1 from the value of the first write data stored in the memory region Cij or the second write data stored in the memory region Dij whichever is other than 0. It is noted that 1 is not subtracted from the first write data or the second write data whose value is 0.

On the other hand, as the process proceeds to step S17, the rewrite judging section 201 compares the data stored in the memory region Aij with the data stored in the memory region Bij. Here, when they are different (step S17; NO) the rewrite judging section 201 specifies the pixel Pij as a pixel whose display state is to be newly changed, and the process proceeds to step S18. In step S18, the data update section 204 writes, to the write data memory region 6, the number of times of voltage application to the pixel necessary to change the gradation of the pixel Pij to the gradation of the memory region Aij. Also, the scheduled image update section 205 overwrites the content of the memory region Bij with the content stored in the memory region Aij (step S19).

As described above, the write control section 203 and the data update section 204 function as an example of a write control device, which stores, when the write state judging device judges that a write operation is not in progress with respect to one pixel, first write data indicative of the number of times of drive voltage application to change the display state of the pixel from the first display state to the second display state, or second write data indicative of the number of times of drive voltage application to change the display state of the pixel from the second display state to the first display state in a first memory region, and performs a write control of applying a drive voltage a plurality of times to the one pixel based on the first write data or the second write data stored in the first memory region. On the other hand, when the write state judging device judges that a write operation is in progress with respect to one pixel, the write control device continues the write operation in progress, and performs the write control upon completion of the write operation.

Next, the write control section 203 judges in step S20 as to whether or not the value of the variable j is the same as the number n of the data lines. If the value of the variable j is not the same as n (step S20; NO), the write control section 203 adds 1 to the value of the variable j (step S21), and the process proceeds to step S13. On the other hand, if the value of the variable j is n (step S20; YES), the write control section 203 judges as to whether or not the value of the variable i is the same as the number m of the scanning lines (step S22). If the value of the variable i is not m (step S22; NO), the write control section 203 adds 1 to the value of the variable i (step S23), and the process proceeds to step S12. When the value of the variable i is m (step S22; YES), the write control section 203 judges as to whether or not refreshing is in progress based on the content of the refresh flag (step S24). When the refresh flag is 0 (step S24; NO), refreshing is not in progress, and therefore the write control section 203 controls the scanning line drive circuit 53 and the data line drive circuit 54 to drive the pixel drive circuits for pixels in the entire display area (step S25), and then the process proceeds to step S27. When the refresh flag is 1 (step S24; YES), refreshing is in progress, and therefore the write control section 203 controls the scanning line drive circuit 53 and the data line drive circuit 54 to drive the pixel drive circuits for pixels in an area excluding the refresh area (step S26), and then the process proceeds to step S27. In this manner, during the period in which refreshing is performed by the refresh processing device, the write control section 203 functions as an example of a write device that does not write an image to the group of pixels that is subject to the refreshing, but writes an image to a group of pixels that is not subject to the refreshing.

Next, the refresh judging section 207 judges as to whether or not writing to white or writing to black is performed at the pixel Pij composing the refresh area (step S27). More specifically, in step S25 or step S26, if application of a positive or a negative voltage is performed for the pixel Pij composing the refresh area, the refresh judging section 207 judges that writing is performed in the refresh area. If application of a positive or a negative voltage is performed for the pixel Pij composing the refresh area (step S27; YES), the refresh judging section 207 adds 1 to the frame number count (step S28), and the process then proceeds to step S11. On the other hand, if application of a positive or a negative voltage is not performed for the pixel Pij composing the refresh area (step S27; NO), the process proceeds to step S11. The above-described process flow is shown in FIG. 6.

Next, referring to FIGS. 7A and 7B, a process flow when refreshing is performed for a refresh area is described. First, the refresh area specifying section 206 specifies a rectangular refresh area based on position information of pixels received from the CPU 3, and stores information of the pixel Pij composing the specified refresh area in the RAM 5 (step S40 in FIG. 7A). The information of the pixel Pij is, specifically, a combination of the variable i and the variable j. Also, in this embodiment, the refresh area is defined by a rectangle with Pqr as its upper left corner, Pqt as the upper right corner, Psr as the lower left corner and Pst as the lower right corner, as viewed from directly above the display section 1.

Next, the refresh judging section 207 judges as to whether or not a refresh condition is met. In accordance with the first embodiment, when the frame number count is equal to or greater than a threshold value stored in the ROM 8, it is judged that the refresh condition is met. When the frame number count is less than the threshold value stored in the ROM 8, it is judged that the refresh condition is not met (step S41 in FIG. 7A). When a judgment YES is made in step S41 in FIG. 7A, the refresh processing section 208 provides an interrupt to the write control section 203, and occupies a refresh area, thereby blocking the write control section 203 from accessing the refresh area, and overwrites the content of the refresh flag with 1 (step S42 in FIG. 7A). It is noted that the timing at which a judgment YES is made in step S41 in FIG. 7A comes after 1 is added to the frame number count in step S28 in FIG. 6.

Next, the refresh processing section 208 writes, to the black write data memory region 6B, "7" that is the number of times of voltage application to the pixels Pij necessary for changing the gradation of the entire pixels Pij composing the refresh area to black "0" (step S43 in FIG. 7A). Also, the refresh processing section 208 overwrites the entire memory regions Bij corresponding to the refresh area with black (step S44 in FIG. 7A). Next, the refresh processing section 208 initializes the values of the variable i and j (steps S45 and S46 in FIG. 7A). Then, the refresh processing section 208 selects a pixel Pij defined by the variables i and j (step S47 in FIG. 7A). For example, when the value of the variable i is q and the value of the variable j is r, a pixel Pqr is selected. The refresh processing section 208 judges as to whether or not the second write data stored in the memory region Dij corresponding to the selected pixel Pij is 0 (step S48 in FIG. 7B). The refresh processing section 208 proceeds to step S55 when the second write data stored in the memory region Dij corresponding to the selected pixel Pij is 0 (step S48 in FIG. 7B; YES), and the process proceeds to step S49 in FIG. 7B, when the second write data is other than 0 (step S48 in FIG. 7B; NO). In step S49 in FIG. 7B, the refresh processing section 208 subtracts 1 from the second write data whose value is other than 0 among the second data stored in the memory region Dij. In other words, 1 is not subtracted from the second write data whose value is 0.

After step S49 in FIG. 7B, the refresh processing section 208 judges in step S50 as to whether or not the value of the variable j is the same as the content of the variable j (i.e., t) at the pixel composing the lower right corner of the refresh area of the display section 1 as viewed from directly above. If the value of the variable j is not the same as t (step S50 in FIG. 7B; NO), the refresh processing section 208 adds 1 to the value of the variable j (step S51 in FIG. 7B), and process proceeds to step S47 in FIG. 7A. If the value of the variable j is t (step S50 in FIG. 7B; YES), the refresh processing section 208 judges as to whether or not the value of the variable i is the same as the content of the variable i (i.e., s) at the pixel composing the lower right corner of the refresh area of the display section 1 as viewed from directly above (step S52 in FIG. 7B). If the value of the variable i is not s (step S52 in FIG. 7B; NO), the refresh processing section 208 adds 1 to the value of the variable i (step S53 in FIG. 7B), and the process proceeds to step S46 in FIG. 7A. If the value of the variable i is s (step S52 in FIG. 7B; YES), the refresh processing section 208 controls the scanning line drive circuit 53 and the data line drive circuit 54 thereby driving the pixel drive circuits (step S54 in FIG. 7B). It is noted that the process in step S54 in FIG. 7B is performed in synchronism with the process in step S26 in FIG. 6.

If, in one round of refreshing, the entire pixels Pij composing the refresh area are displayed in black (the gradation is 0), the entire second write data in the memory region Dij corresponding to the refresh area are 0. Therefore, at this timing, the judgment result in step S48 in FIG. 7B becomes YES, and the process proceeds to step S55 in FIG. 7B. In step S55 in FIG. 7B, the refresh processing section 208 judges as to whether or not the content of a white write start flag stored in the RAM 5 is 1. The white write start flag represents as to whether or not the process of rewriting the entire pixels Pij in the refresh area to white has been started. When the content of the white write start flag has a value 1, this means that the process of rewriting to white is in progress. On the other hand, when the content of the white write start flag has a value 0, this means that the process of rewriting to white is not in progress. The refresh processing section 208 proceeds to step S56 when the white write start flag is 0 (step S55 in FIG. 7B; NO), and proceeds to step S59 in FIG. 7B when the white write start flag is 1 (step S55 in FIG. 7B; YES).

In step S56 in FIG. 7B, the refresh processing section 208 writes, to the white write data memory region 6A, "7" that is the number of times of voltage application to the pixels Pij necessary for changing the gradation of the entire pixels Pij composing the refresh area to white "7" (step S56 in FIG. 7B). Also, the refresh processing section 208 overwrites the entire memory regions Bij corresponding to the refresh area with white (step S57 in FIG. 7B). Then, the refresh processing section 208 overwrites the content of the white write start flag with 1 (step S58 in FIG. 7B), and the process proceeds to step S55 in FIG. 7B. As the content of the white write start flag is 1 (step S55 in FIG. 7B; YES), the process proceeds to step S59 in FIG. 7B.

The refresh processing section 208 judges as to whether or not the first write data stored in the memory region Cij corresponding to the selected pixel Pij is 0 (step S59 in FIG. 7B). The refresh processing section 208 proceeds to step S61 when the first write data stored in the memory region Cij corresponding to the selected pixel Pij is 0 (step S59 in FIG. 7B; YES), and proceeds to step S60 in FIG. 7B when the first write data is other than 0 (step S59 in FIG. 7B; NO). In step S60 in FIG. 7B, the refresh processing section 208 subtracts 1 from the first write data whose value is other than 0 among the first data stored in the memory region Cij. In other words, 1 is not subtracted from the first write data whose value is 0.

After step S60 in FIG. 7B, the process proceeds to step S50 in FIG. 7B, and the refresh processing section 208 operates, like in the operation of rewriting to black, to bring the refresh area to an all-white display while changing selected pixels, according to the process flow shown in FIGS. 7A and 7B. When the process proceeds to step S59 in FIG. 7B, in a state in which the all-white display is completed for the refresh area, the entire pixels Pij composing the refresh area are displayed in white (the gradation is 7), and the entire first write data in the memory region Cij corresponding to the refresh area are 0. Therefore, a judgment YES is made in step S59 in FIG. 7B, and the process proceeds to step S61 in FIG. 7B. In step S61 in FIG. 7B, the refresh judging section 20 resets the variable corresponding to the refresh start condition. In the first embodiment, in step S61 in FIG. 7B, the refresh judging section 207 overwrites the frame number count with 0. Next, the refresh processing section 208 releases the occupied refresh area, allowing the write control section 203 to access the refresh area, overwrites the refreshing content with 0 (step S62 in FIG. 7B), and proceeds to step S40 in FIG. 7A.

Next, referring to FIGS. 8-26, changes in the display on the display section 1, changes in the contents of the VRAM 4, changes in the contents of the scheduled image data memory region 7 and changes in the contents of the write data memory region 6 from the time when image data is written to the VRAM4 until an image of the image data is displayed on the display section 1 are described. In here, it is assumed that the pixels P12 and P13 are specified by the refresh area specifying section 206 as a refresh area. Also, in here, the threshold value of the frame number count that is stored in the ROM and serves as a judgment reference for performing refreshing is assumed to be "7."

Figure 8:
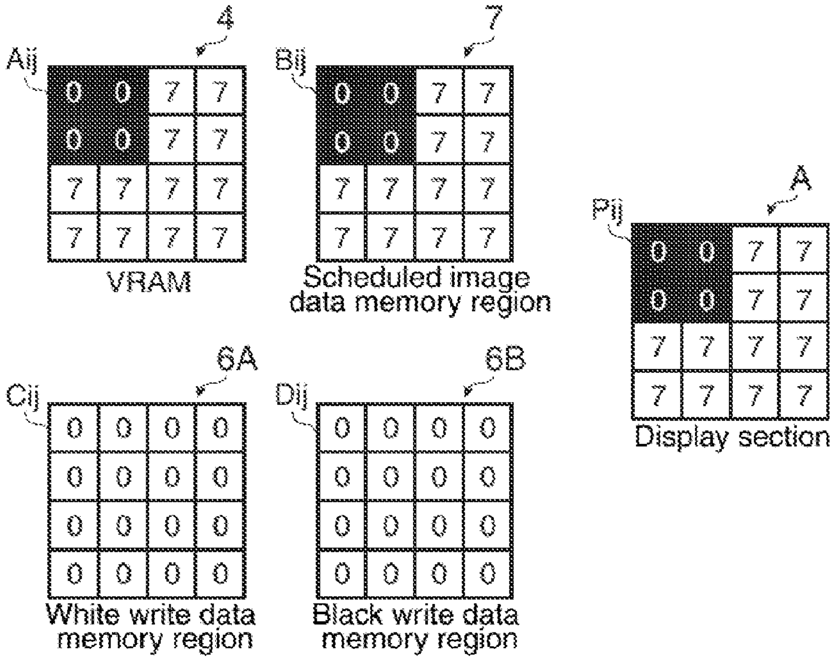
FIG. 8 shows diagrams for describing the operation of the electrophoretic display device 100.
Figure 9:
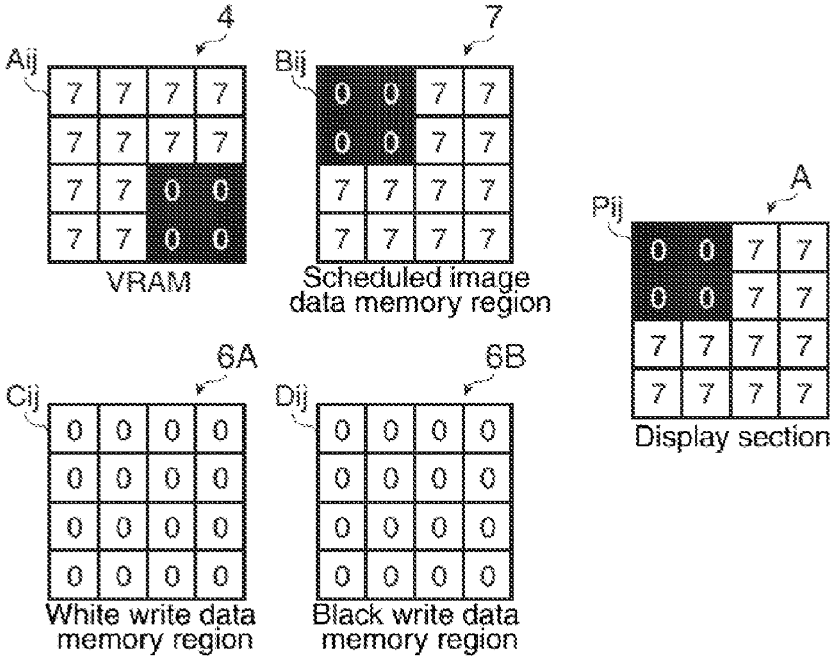
FIG. 9 shows diagrams for describing the operation of the electrophoretic display device 100 in which the state of VRAM 4 is changed from FIG. 8.
Figure 10:
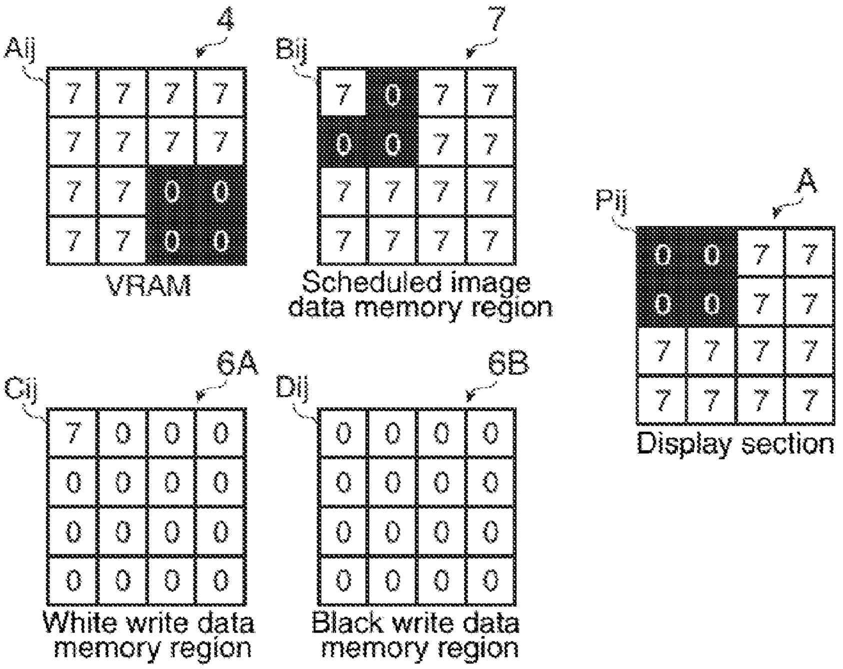
FIG. 10 shows diagrams for describing the operation of the electrophoretic display device 100 in which scheduled image data memory region 7 and white write data memory region 6A are changed from FIG. 9.

When the CPU 3 writes image data to the VRAM 4, when the display on the display section 1, the VRAM 4, the write data memory region 6, and the scheduled image data memory region 7 are in the state shown in FIG. 8, the state of the VRAM 4 changes according to the image data to a state as shown in FIG. 9. When a pixel P11 is selected in step S13 in the state shown in FIG. 9, a judgment NO is made in step S14, a judgment YES is made in step S15, and a judgment NO is made in step S17. Here, the content of the memory region B11 indicates black, and the content of the memory region A11 indicates white, such that the pixel P11 will be changed from black to white. Accordingly, in step S18, 7 is written to the memory region C11, and the content of the memory region A11 is written to the memory region B11 in step S19, which results in a state shown in FIG. 10.

Figure 11:
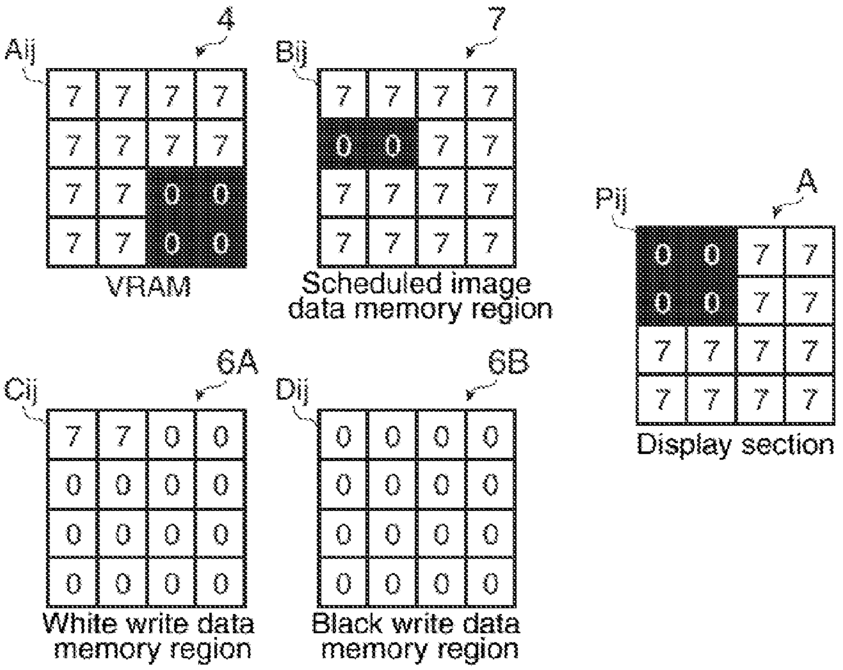
FIG. 11 shows diagrams for describing the operation of the electrophoretic display device 100 in which scheduled image data memory region 7 and white write data memory region 6A are changed from FIG. 10.
Figure 12:
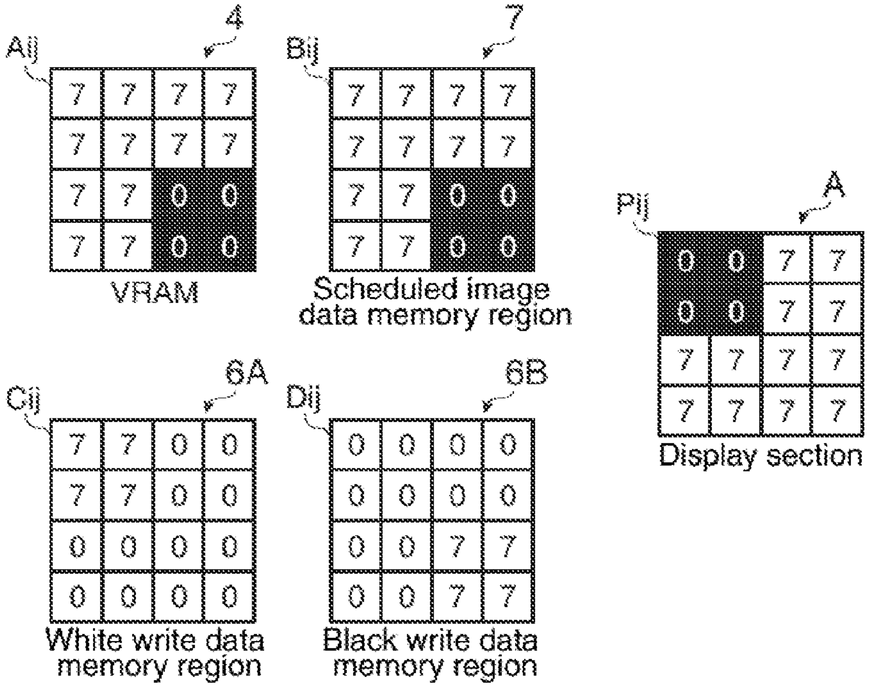
FIG. 12 shows diagrams for describing the operation of the electrophoretic display device 100 in which scheduled image data memory region 7, white write data memory region 6A, black write data memory region 6B, and the display section are changed from FIG. 11.
Figure 13:
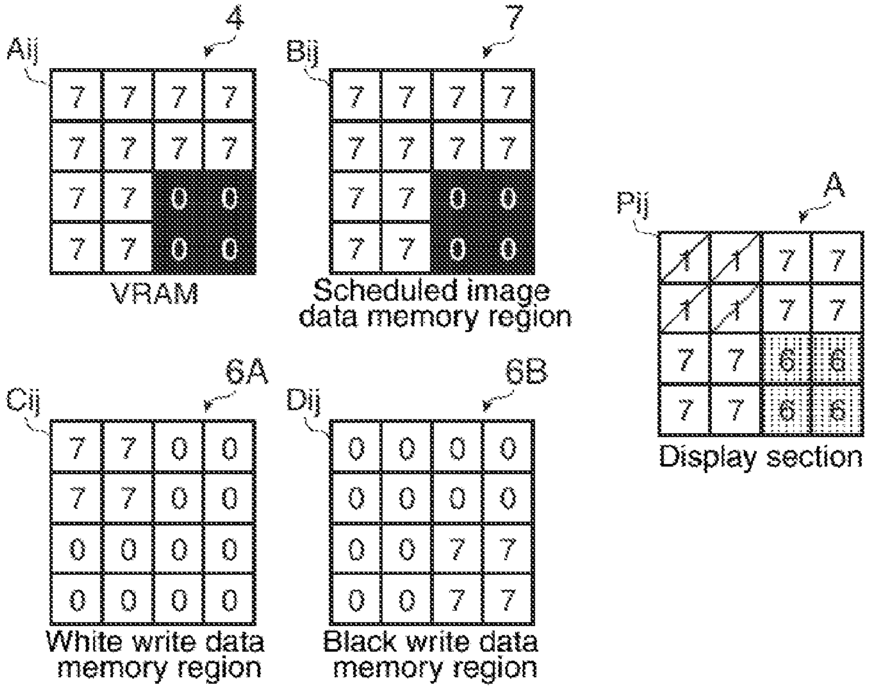
FIG. 13 shows diagrams for describing the operation of the electrophoretic display device 100 in which the display section is changed from FIG. 12.

Next, when a pixel P12 is selected, a judgment NO is made in step S14 in FIG. 6, a judgment YES is made in step S15 in FIG. 6, and a judgment NO is made in step S17 in FIG. 6. Accordingly, in step S18 in FIG. 6, 7 is written to the memory region C12, and the content of the memory region A12 is written to the memory region B12 in step S19 in FIG. 6, as shown in FIG. 11. Further, when a pixel P33 is selected, a judgment NO is made in step S14 in FIG. 6, a judgment YES is made in step S15 in FIG. 6, and a judgment NO is made in step S17 in FIG. 6. Here, the content of the memory region B33 indicates white, and the content of the memory region A33 indicates black, such that the pixel P33 will be changed from white to black. Accordingly, in step S18 in FIG. 6, 7 is written to the memory region D33, and the content of the memory region A33 is written to the memory region B33 in step S19 in FIG. 6. Thereafter, the process proceeds up to a point where a pixel P44 is selected, the contents of the scheduled image data memory region 7 and the contents of the VRAM 4 become the same, as shown in FIG. 12. Also, the white write data memory region 6A assumes a state in which 7 is written to each of the memory regions C11, C12, C21 and C22, and the black write data memory region 6B assumes a state in which 7 is written to each of the memory regions D33, D34, D43 and D44.

Thereafter, when a judgment NO is made in step S24 in FIG. 6, and the process in step S25 in FIG. 6 is executed, at a pixel drive circuit corresponding to the pixel P11 (a pixel drive circuit corresponding to an intersection between the scanning line 64 in the first row and the data line 65 in the first column), as the content of the memory region C11 is other than 0, a voltage is applied to the data line 65 such that the pixel electrode 13*a* has a potential of −15V with respect to the potential Vcom on the transparent electrode layer 32 when the scanning line 64 is selected. Also, at pixel drive circuits corresponding to the pixels P12, P21 and P22, as the contents of the memory regions C12, C21 and C22 are other than 0, a voltage is applied to the data lines 65 such that the pixel electrodes 13*a* have a potential of −15V with respect to the potential Vcom on the transparent electrode layer 32 when the scanning lines 64 are selected. Also, at a pixel drive circuit corresponding to the pixel P33 (a pixel drive circuit corresponding to an intersection between the scanning line 64 in the third row and the data line 65 in the third column), as the content of the memory region D33 is other than 0, a voltage is applied to the data line 65 such that the pixel electrode 13*a* has a potential of +15V with respect to the potential Vcom on the transparent electrode layer 32 when the scanning line 64 is selected. Also, at pixel drive circuits corresponding to the pixels P34, P43 and P44, as the contents of the memory regions D34, D43 and D44 are other than 0, a voltage is applied to the data lines 65 such that the pixel electrodes 13*a* have a potential of +15V with respect to the potential Vcom on the transparent electrode layer 32 when the scanning lines 64 are selected.

For the other pixels, because the contents of the memory regions corresponding to the white write data memory region 6A are 0, and the contents of the memory regions corresponding to the black write data memory region 6B are 0, a voltage is applied to the data lines 65 such that the pixel electrodes 13*a* have a potential difference of 0V with respect to the potential Vcom on the transparent electrode layer 32 when the scanning lines 64 are selected. Next, as a judgment YES is made in step S27 in FIG. 6 in judging as to whether or not writing to white or writing to black is performed at the P12 and P13 defining the refresh area, the refresh judging section 207 adds 1 to the frame number count in step S28 in FIG. 6. As the voltage is applied to the data lines in the manner described above, white particles and black particles migrate at the pixels, and the display section 1 assumes a display state shown in FIG. 13.

As the process in step S28 in FIG. 6 is finished, the write control section 203 returns the process to step S11 in FIG. 6. When the pixel P11 is selected in step S13 in FIG. 6 in the state shown in FIG. 13, a judgment NO is made in step S14 in FIG. 6, a judgment NO is made in step S15 in FIGS. 6, and 1 is subtracted from the value written to the memory region C11, such that the content of the memory region C11 becomes 6. Next, when the pixel P12 is selected in step S13 in FIG. 6, a judgment NO is made in step S14 in FIG. 6, a judgment NO is made in step S15 in FIG. 6, 1 is subtracted from the value written to the memory region C12, such that the content of the memory region C12 becomes 6. Thereafter, as the process is advanced up to a point where the pixel P44 is selected, the contents of the memory regions C11, C12, C21 and C22 become 6, and the contents of the memory regions D33, D34, D43 and D44 become 6, as shown in FIG. 14.

Figure 14:
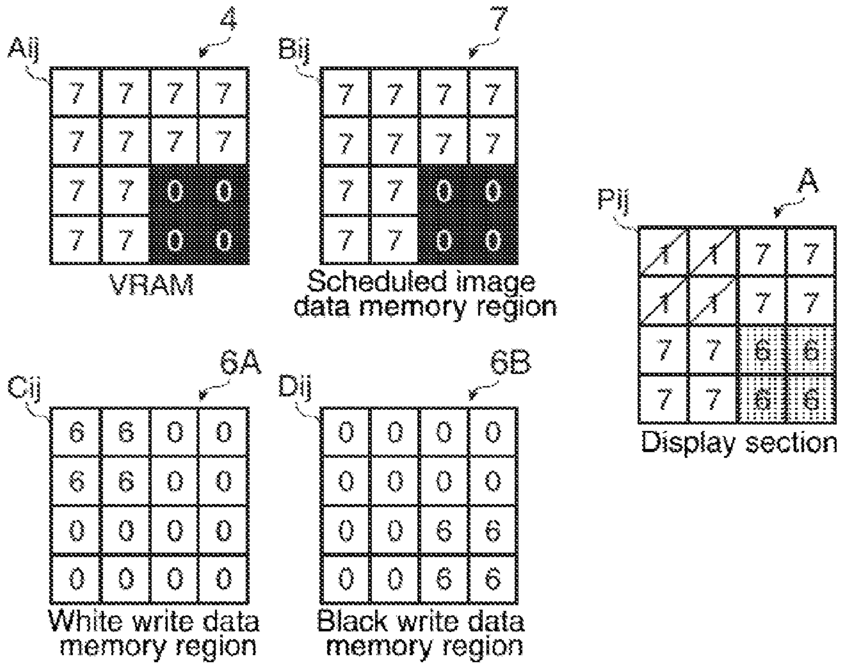
FIG. 14 shows diagrams for describing the operation of the electrophoretic display device 100 in which white write data memory region 6A and black write data memory region 6B are changed from FIG. 13.
Figure 15:
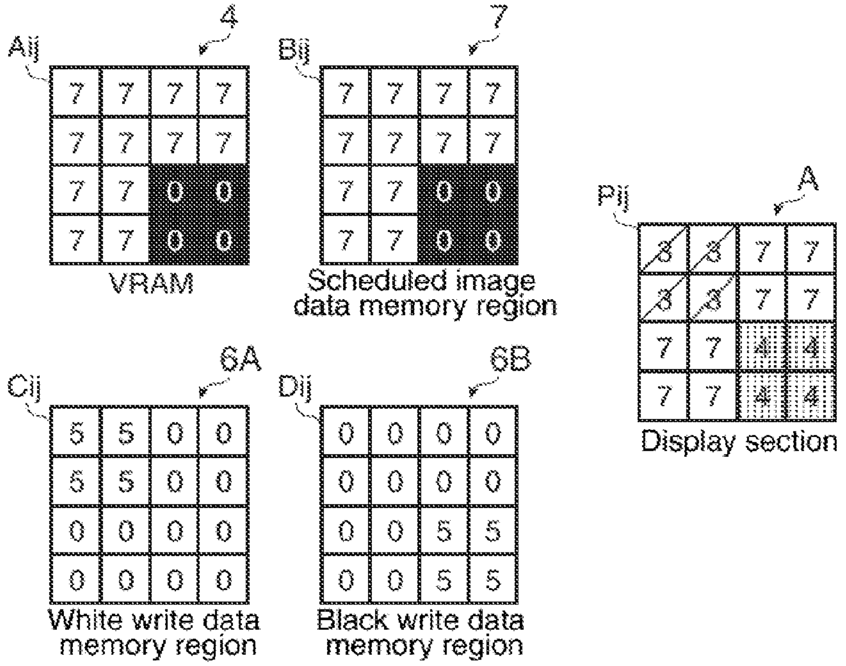
FIG. 15 shows diagrams for describing the operation of the electrophoretic display device 100 in which white write data memory region 6A, black write data memory region 6B, and the display section are changed from FIG. 14.
Figure 16:
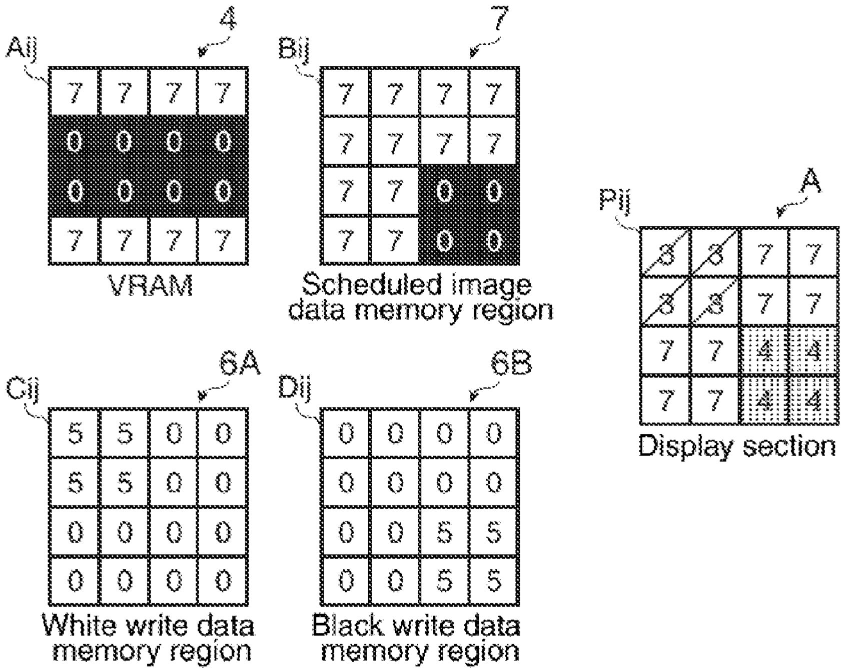
FIG. 16 shows diagrams for describing the operation of the electrophoretic display device 100 in which VRAM 4 is changed from FIG. 15.

FIG. 15 shows a state immediately after the process in step S25 in FIG. 6 has been executed twice since the state shown in FIG. 14. Here, a case where the contents of the VRAM 4 are rewritten as shown in FIG. 16 is considered. When a pixel P21 is selected in step S13 in FIG. 6 in the state shown in FIG. 16, a judgment NO is made in step S14 in FIG. 6, a judgment NO is made in step S15 in FIGS. 6, and 1 is subtracted from the value written to the memory region C21 in step S16 in FIG. 6, such that the content of the memory region C21 becomes 4. On the other hand, when a pixel P23 is selected in step S13 in FIG. 6, a judgment NO is made in step S14, a judgment YES is made in step S15 in FIG. 6, and a judgment NO is made in step S17 in FIG. 6. Then, in step S18 in FIG. 6, 7 is written to the memory region D23, and the content of the memory region A23 is written to the memory region B23 in step S19 in FIG. 6. In this manner, even when the content of the VRAM 4 is rewritten from white to black, rewriting to white is proceeded for those of the pixels that are being written to white, and the second write data is stored to the black write data memory region 6B for those of the pixels with which rewriting is not performed. Further, when a pixel P43 is selected in step S13 in FIG. 6 in the state shown in FIG. 16, a judgment NO is made in step S14 in FIG. 6, a judgment NO is made in step S15 in FIGS. 6, and 1 is subtracted from the value written to the memory region D43 in step S16 in FIG. 6, such that the content of the memory region D43 becomes 4. In this manner, even when the content of the VRAM 4 is rewritten from black to white, rewriting to black is advanced for those of the pixels that are in progress of being written to black.

Figure 17:
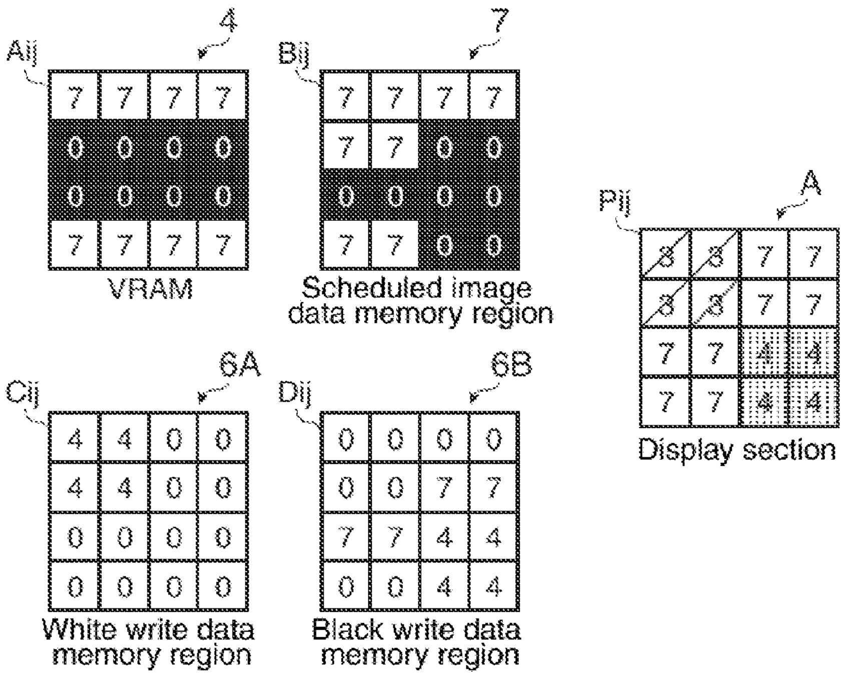
FIG. 17 shows diagrams for describing the operation of the electrophoretic display device 100 in which scheduled image data memory region 7, white write data memory region 6A, and black write data memory region 6B are changed from FIG. 16.

As the process is advanced from the state shown in FIG. 16 up to a point where a judgment YES is made in step S22 in FIG. 6, the VRAM 4 and each of the memory regions assume a state shown in FIG. 17. Further, the process is advanced from the state shown in FIG. 17 up to a point where steps S24-S28 in FIG. 6 are executed, the display section 1 presents a state shown in FIG. 18, where, for the pixels corresponding to a portion of the contents of the VRAM 4 that are rewritten, the ongoing rewriting is advanced for those of the pixels that are in the process of being rewritten, and new pixel rewriting will be started for those of the pixels that are not in the process of being rewritten.

Figure 18:
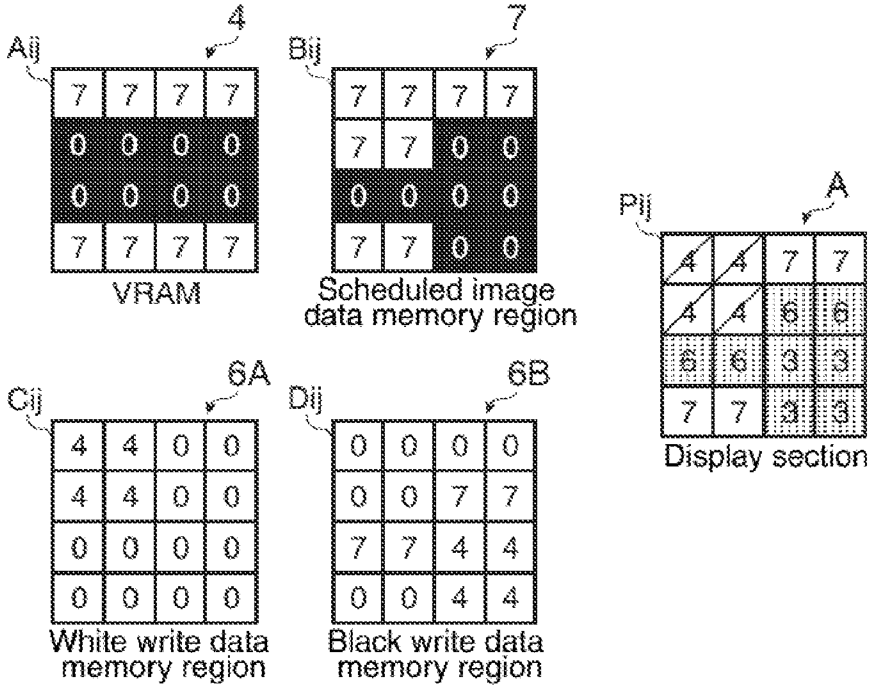
FIG. 18 shows diagrams for describing the operation of the electrophoretic display device 100 in which the display section is changed from FIG. 17.
Figure 19:
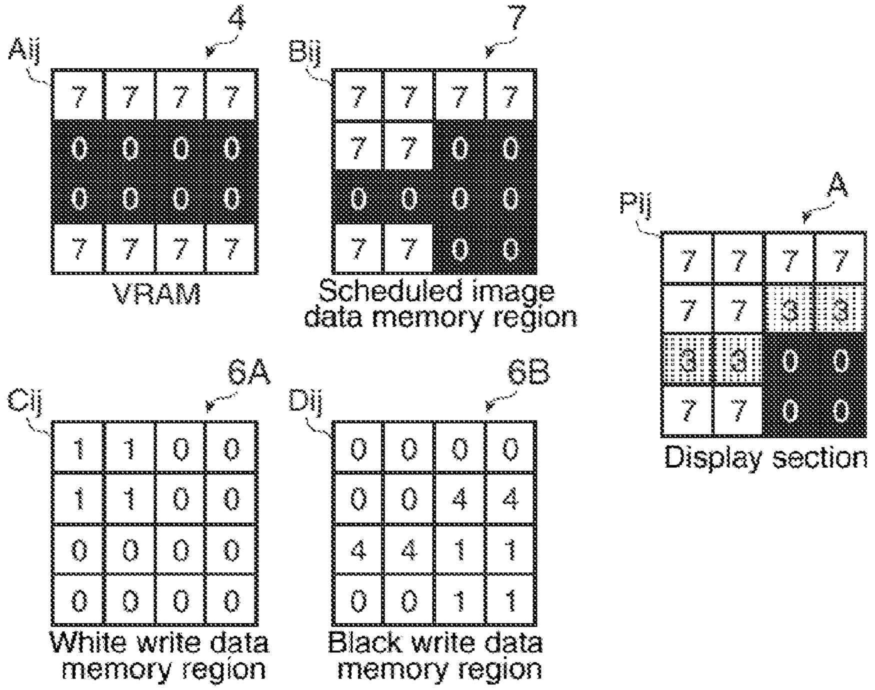
FIG. 19 shows diagrams for describing the operation of the electrophoretic display device 100 in which white write data memory region 6A, black write data memory region 6B, and the display section are changed from FIG. 18.

FIG. 19 shows a state immediately after the process in step S25 in FIG. 6 has been executed three times since the state shown in FIG. 18. Thereafter, a judgment YES is made in step S27 in FIG. 6, and the refresh judging section 207 adds 1 to the frame number count in step S28 in FIG. 6. Up to this process, the pixel P12 composing the refresh area has gone through seven frames of rewriting. Here, the value of the frame number count becomes "7" that is greater than the threshold value, such that a judgment YES is made in step S41 in FIG. 7A. Accordingly, the refresh processing section 208 provides an interrupt to the write control section 203, occupying the pixels P12 and P13 that is the refresh area, and then overwrites the refresh flag with 1. Then, the refresh processing section 208 starts refreshing the refresh area, in parallel with writing to the display region other than the refresh area performed by the write control section 203. Here, the refresh processing section 208 writes 7 to the memory regions D12 and D13 in step S43 in FIG. 7A, and the memory regions B12 and B13 are rewritten with black in step S44 in FIG. 7A. Then, the process shown in FIG. 6 is further advanced, and when the values of the first write data and the second write data for the pixels with which rewriting has been started earlier become 0, each of the memory regions and the display of the display section 1 assume a state shown in FIG. 20.

Figure 20:
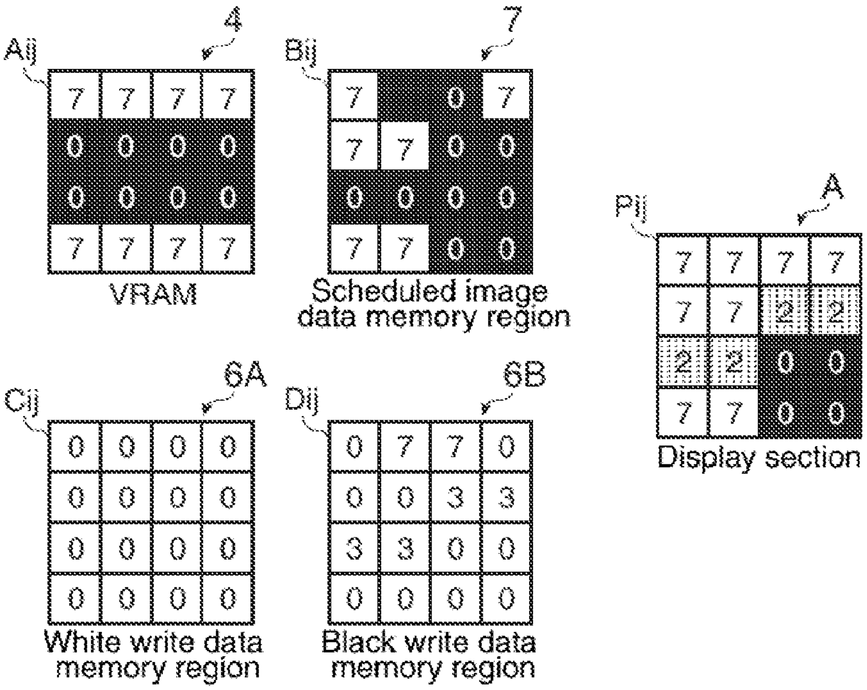
FIG. 20 shows diagrams for describing the operation of the electrophoretic display device 100 in which scheduled image data memory region 7, white write data memory region 6A, black write data memory region 6B, and the display section are changed from FIG. 19.
Figure 21:
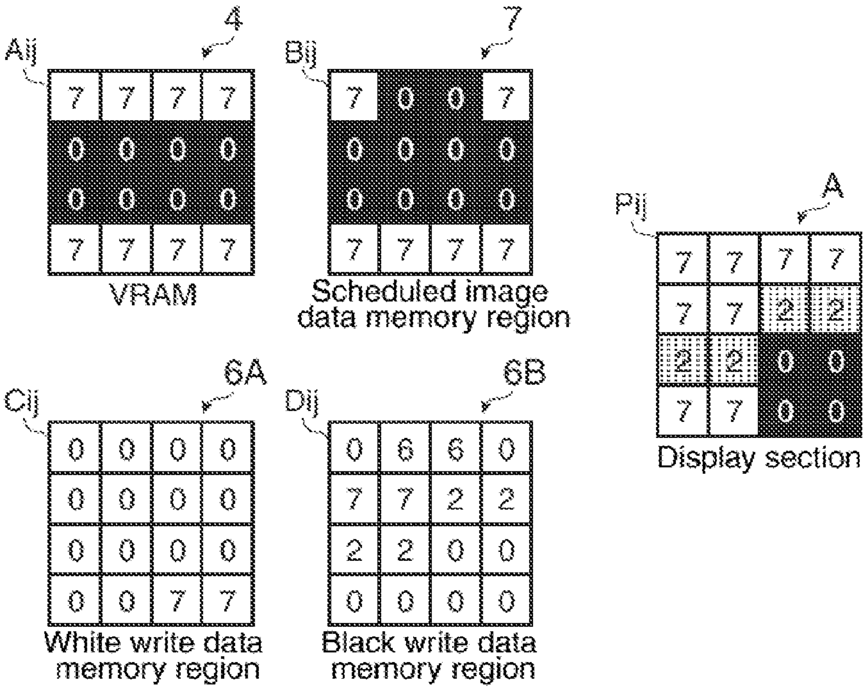
FIG. 21 shows diagrams for describing the operation of the electrophoretic display device 100 in which scheduled image data memory region 7, white write data memory region 6A, and black write data memory region 6B are changed from FIG. 20.
Figure 22:
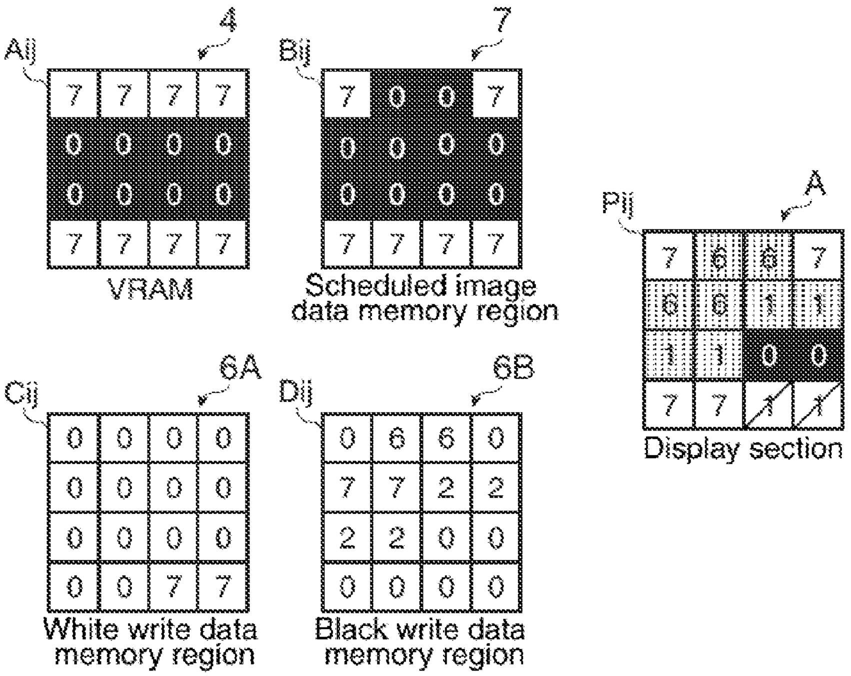
FIG. 22 shows diagrams for describing the operation of the electrophoretic display device 100 in which the display section is changed from FIG. 21.

As the process is advanced from the state shown in FIG. 20 up to a point where the pixel P21 is selected in step S13 in FIG. 6, a judgment NO is made in step S14 in FIG. 6, a judgment YES is made in step S15 in FIG. 6, and a judgment NO is made in step S17 in FIG. 6. Accordingly, 7 is written to the memory region D21 in step S18 in FIG. 6, and the content of the memory region A21 is written to the memory region B21 in step S19 in FIG. 6. Also, when the pixel P43 is selected in step S13 in FIG. 6, a judgment NO is made in step S14 in FIG. 6, a judgment YES is made in step S15 in FIG. 6, and a judgment NO is made in step S17 in FIG. 6. Accordingly, 7 is written to the memory region C43 in step S18 in FIG. 6, and the content of the memory region A43 is written to the memory region B43 in step S19 in FIG. 6. Thereafter, as the process is advanced up to a point where a judgment YES is made in step S22 in FIG. 6 and in step S52 in FIG. 7B, the contents of the respective memory regions assume a state shown in FIG. 21, and as the process in step S26 in FIG. 6 and the process in step S54 in FIG. 7B is executed, they assume a state shown in FIG. 22.

Figure 23:
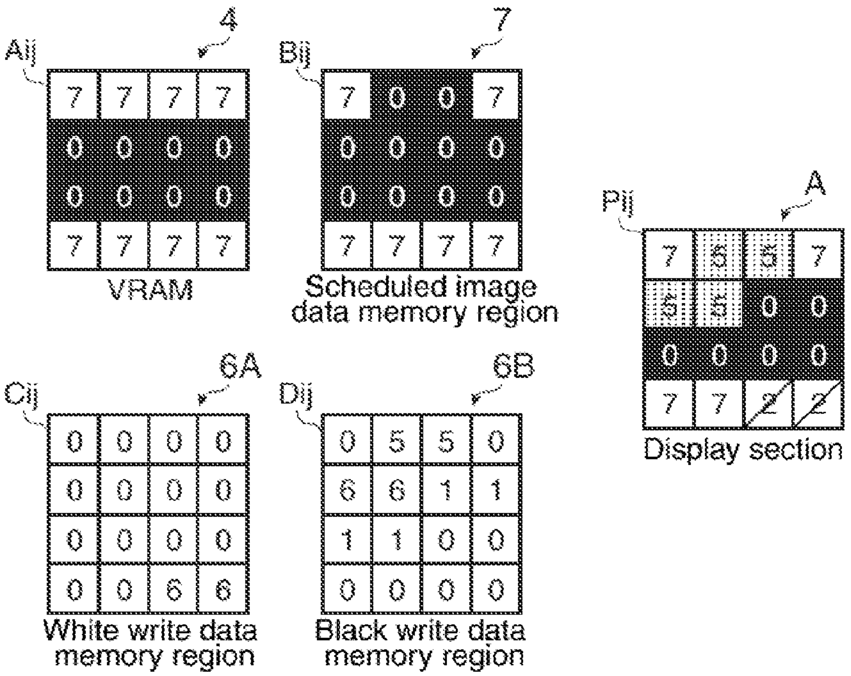
FIG. 23 shows diagrams for describing the operation of the electrophoretic display device 100 in which white write data memory region 6A, black write data memory region 6B, and the display section are changed from FIG. 22.
Figure 24:
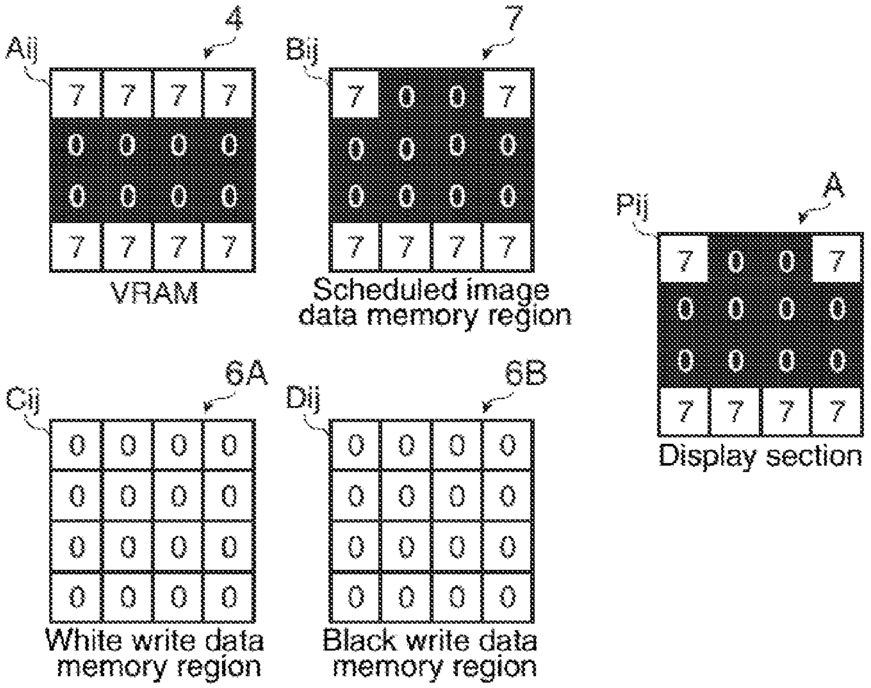
FIG. 24 shows diagrams for describing the operation of the electrophoretic display device 100 in which white write data memory region 6A, black write data memory region 6B, and the display section are changed from FIG. 23.
Figure 25:
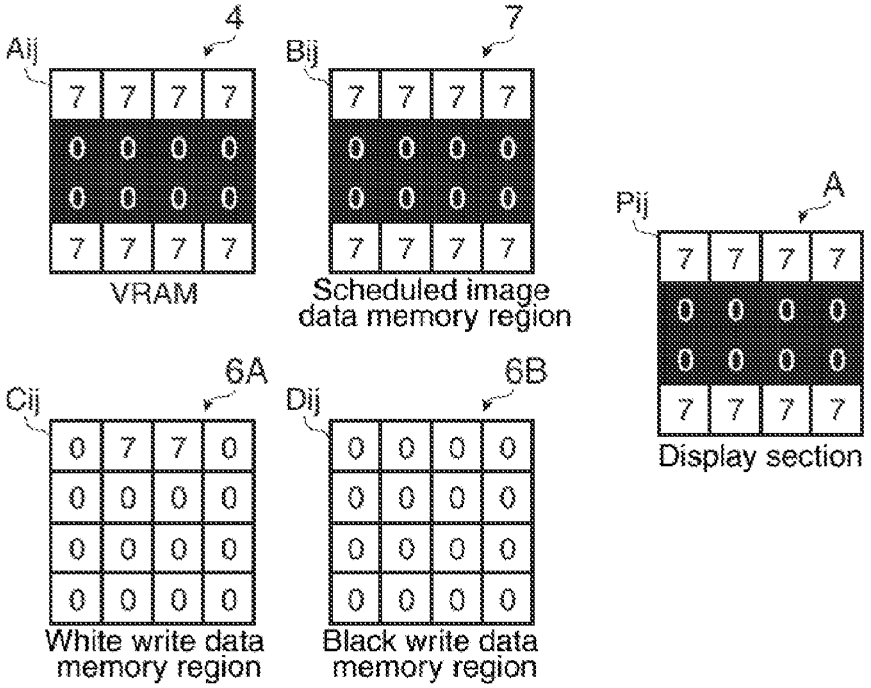
FIG. 25 shows diagrams for describing the operation of the electrophoretic display device 100 in which scheduled image data memory region 7, white write data memory region 6A, black write data memory region 6B, and the display section are changed from FIG. 24.
Figure 26:
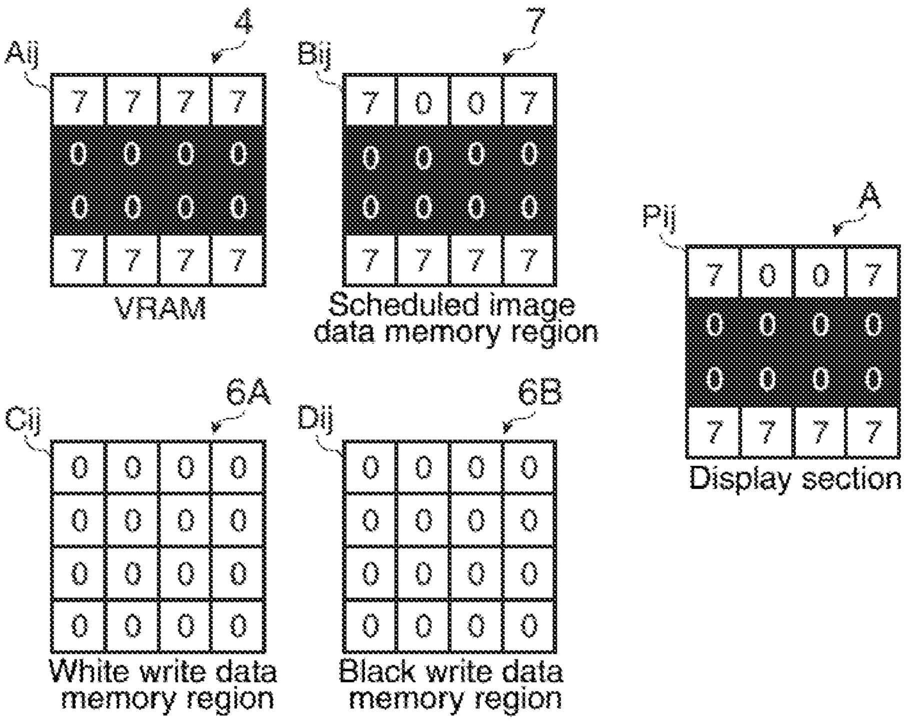
FIG. 26 shows diagrams for describing the operation of the electrophoretic display device 100 in which scheduled image data memory region 7, white write data memory region 6A, and the display section are changed from FIG. 25.

Thereafter, as the process is advanced up to a point where rewriting to the pixels P23, P24, P31 and P32 is completed, the memory regions assume a state shown in FIG. 23. Also, as the process is advanced and rewriting to the pixels P12, P13, P21, P22, P43 and P44 is advanced, the memory regions assume a state shown in FIG. 24. Here, when the pixel P12 is selected in step S47 in FIG. 7A, a judgment YES is made in step S48 in FIG. 7B, and a judgment NO is made in step S55 in FIG. 7B. Accordingly, 7 is written to the memory regions C12 and C13 in step S56 in FIG. 7B by the refresh processing section 208, and the memory regions B12 and B13 are rewritten with white in step S57 in FIG. 7B, such that the memory regions assume a state shown in FIG. 25. Thereafter, the process is advanced, and rewriting of the pixels P12 and P13 is advanced, which finally presents a state shown in FIG. 26. Here, when the pixel P12 is selected in step S47 in FIG. 7A, a judgment YES is made in step S48 in FIG. 7B, a judgment YES is made in step S55 in FIG. 7B, and a judgment YES is made in step S59 in FIG. 7B. As a result, the refresh judging section 207 overwrites the frame number count with 0. Further, the refresh judging section 207 releases the refresh area that has been occupied (the pixels P12 and P13 in this example), and overwrites the refresh flag with 0.

In this manner, in accordance with the first embodiment, even when the write control section 203 is performing writing to pixels, when the time comes for refreshing a predetermined area, the refresh processing section 208 interrupts the process regardless of whether or not the rewriting by the write control section 203 is in progress, and performs refreshing for the predetermined area. As the refreshing is performed when the frame number count becomes equal to or greater than a threshold value, the timing for performing refreshing can be limited to moments when there is a greater possibility in that the display section would have a lowered visibility. Further, in accordance with the first embodiment, refreshing can be performed at the timing when the pixel driving at each frame is finished. Also, at this time, the write control section 203 normally performs the write process for areas other than the predetermined area that is subject to refreshing. In other words, an image display can be progressed in areas other than the area that is subject to refreshing, such that an apparent response speed up to a moment where contents of an image are recognized is improved, compared to a refreshing operation that performs a black display or a white display for pixels in the entire region.

Second Embodiment

Next, a second embodiment of the invention is described below. The second embodiment is different from the first embodiment in process contents of the refresh judging section 207 and a part of the flow chart thereof. Description of other portions of the second embodiment which are the same as those of the first embodiment will be omitted.

In accordance with the second embodiment, the refresh judging section 207 obtains the number of pixels whose display state is changed from white to black or from black to white in a refresh area, and stores the number of added pixels in the RAM 5. The added number of pixels in a refresh area whose display state is to be changed is called here the added update pixel number. When the added update pixel number becomes equal to or greater than a predetermined threshold value stored in the ROM 8, the refresh judging section 207 judges that refreshing should be performed for the refresh area. In other words, the added update pixel number is an example of a value relating to the number of times of writing, and is an example of the number of pixels, among a group of pixels specified by a specifying device, with which writing from the first display state to the second display state is performed, or an example of the number of pixels, among a group of pixels specified by a specifying device, with which writing from the second display state to the first display state is performed.

Figure 27:
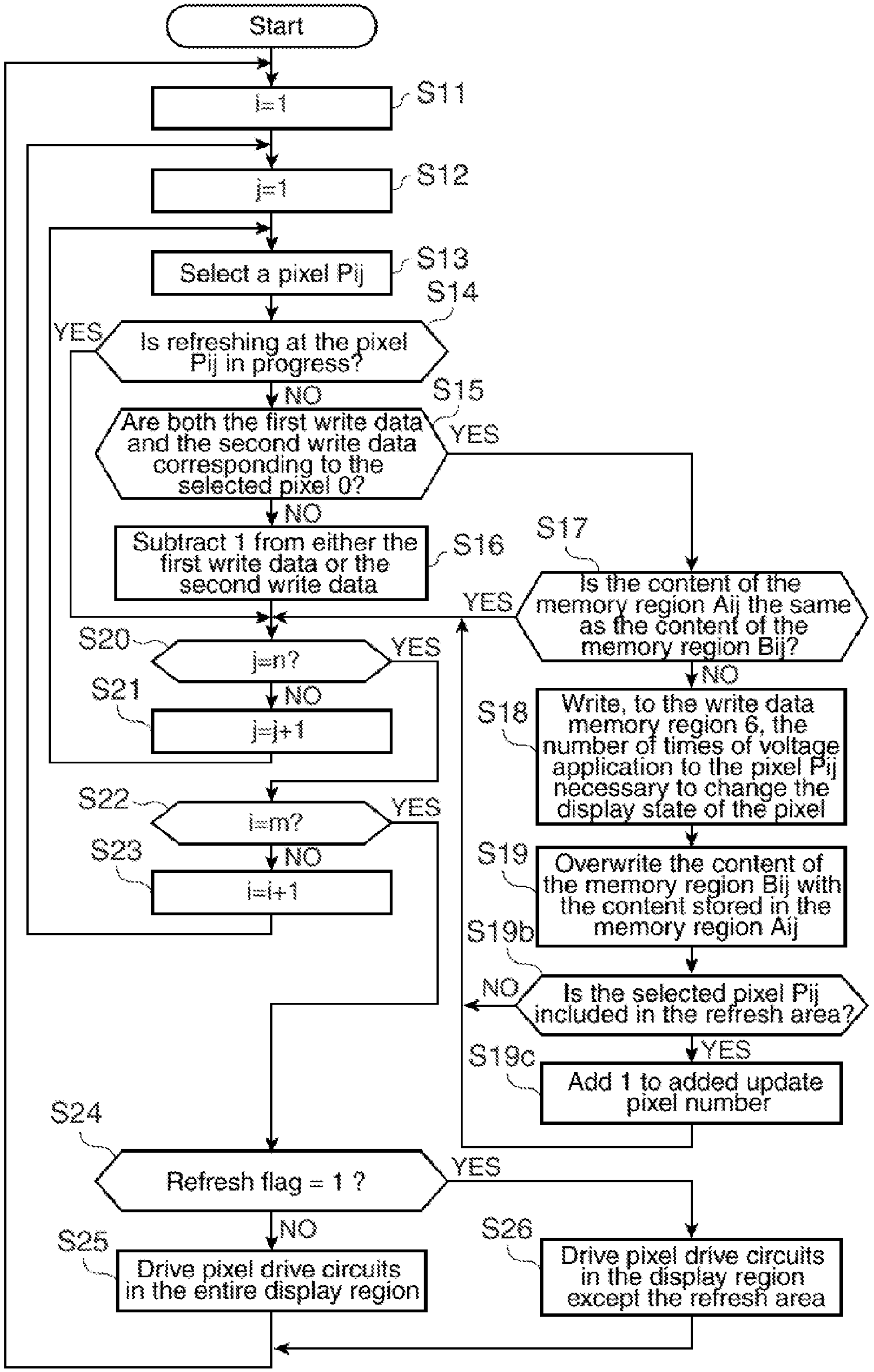
FIG. 27 shows diagrams for describing the operation of an electrophoretic display device 100 in accordance with the second embodiment.

FIG. 27 is a flow chart of processes performed by the controller 2 in accordance with the second embodiment. Let us assume that a pixel Pij is selected (step S13), a judgment NO is made in step S14, a judgment YES is made in step S15, and a judgment NO is made in step S17. In other words, the above represents a state in which, for the selected pixel Pij, the content of the memory region Aij in the VRAM 4 is different from the content of the memory region Bij in the scheduled image data memory region 7. Accordingly, writing from white to black or black to white is performed for the selected pixel Pij. When the processes in step S18 and step S19 are finished, the write control section 203 judges as to whether or not the selected pixel Pij is included in the refresh area (step S19*b*). When the selected Pij is not included in the refresh area (step S19*b*; NO), the process proceeds to step S20. When the selected pixel Pij is included in the refresh area (step S19*b*; YES), the rewrite judging section 207 adds 1 to the added update pixel number (step S19*c*), and the process proceeds to step S20.

Next, referring to FIGS. 7A and 7B, a process flow of a refreshing operation performed for the refresh area in accordance with the second embodiment is described. The refresh area specifying section stores information of the pixel Pij composing the specified refresh area in the RAM 5 (step S40 in FIG. 7A). The refresh judging section 207 judges as to whether or not an added update pixel number stored in the RAM 5 is equal to or greater than a predetermined threshold value stored in the ROM 8 (step S41 in FIG. 7A). When it is judged that the added update pixel number is equal to or greater than the predetermined threshold value (step S41 in FIG. 7A; YES), the process proceeds to step S42 in FIG. 7A, and refreshing is started. As the process is advanced up to a state in which a judgment YES is made in step S59 in FIG. 7B, in other words, a state in which refreshing is completed, the refresh judging section 207 overwrites the added update pixel number with 0 (step S61 in FIG. 7B).

Next, the operation of the electrophoretic display device 100 in accordance with the second embodiment will be described with reference to the flow charts in FIG. 7A, FIG. 7B and FIG. 27, FIGS. 8-17 and FIGS. 28-34. More specifically, changes in the display on the display section 1, changes in the contents of the VRAM 4, changes in the contents of the scheduled image data memory region 7 and changes in the contents of the write data memory region 6 from the time when image data is written to the VRAM4 until an image of the image data is displayed on the display section 1 are described. Here, it is assumed that the pixels P22, P23, P24, P32, P33, P34, P42, P43 and P44 are specified by the refresh area specifying section 206 as a refresh area. Also, the threshold value of the added update pixel number that serves as a judgment reference for performing refreshing is assumed to be "8."

Let us assume that the process is advanced from the state where the display on the display device 1, the VRAM 4, the write data memory region 6 and the scheduled image data memory region 7 are in a state shown in FIG. 8, up to a state shown in FIG. 12. Here, in the process in which the state shown in FIG. 11 changes to the state shown in FIG. 12, when each of the pixels P22, P33, P34, P43 and P44 is selected in step S13 in FIG. 27, a judgment YES is made in step S19*b* in FIG. 27, and an addition to the added update pixel number is performed by the refresh judging section 207. As a result, in the state in FIG. 12, the added update pixel number becomes "5." Here, let us assume that the process is advanced from the state in FIG. 12 to the state shown in FIG. 17. In the process in which the state shown in FIG. 16 changes to the state shown in FIG. 17, when each of the pixels P23, P24 and P32 is selected in step S13 in FIG. 27, a judgment YES is made in step S19*b* in FIG. 27, and an addition to the added update pixel number is performed by the refresh judging section 20. As a result, in the state shown in FIG. 17, the added update pixel number becomes "8." Here, the added update pixel number is equal to or greater than the threshold value, such that a judgment YES is made in step S41 in FIG. 7A. Accordingly, the refresh processing section 208 provides an interrupt to the write control section 203, occupies the pixels P22, P23, P24, P32, P33, P34, P42, P43 and P44 which define a refresh area, and overwrites the refresh flag with 1. In parallel with the writing to the display area other than the refresh area performed by the write control section 203, the refresh processing section 208 starts a refreshing process to the refresh area.

Figure 28:
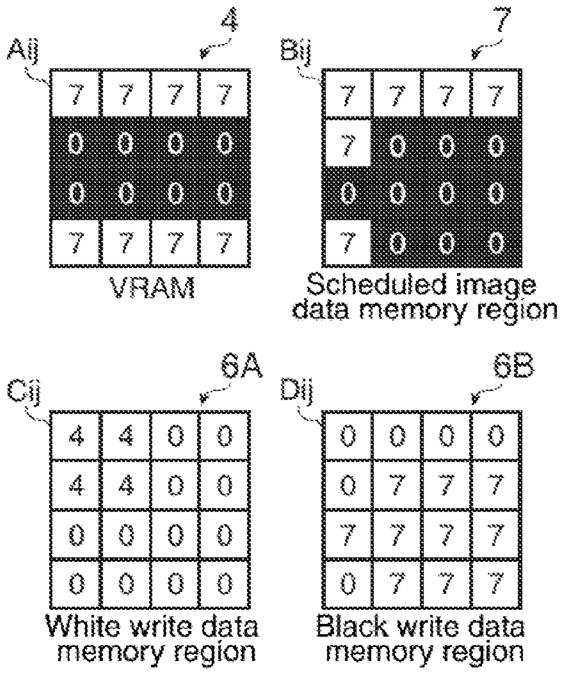
FIG. 28 shows diagrams for describing the operation of an electrophoretic display device 100 in which scheduled image data memory region 7, white write data memory region 6A, and black write data memory region 6B are changed from FIG. 17 in accordance with the second embodiment.
Figure 29:
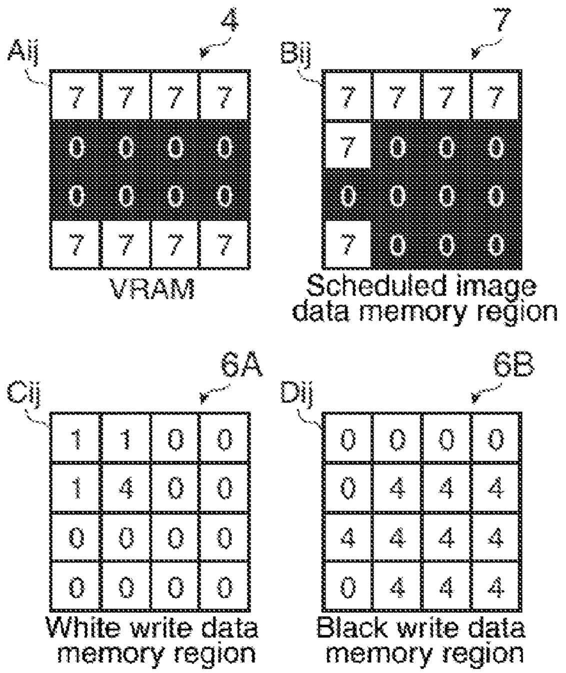
FIG. 29 shows diagrams for describing the operation of the electrophoretic display device 100 in which white write data memory region 6A, black write data memory region 6B, and the display section are changed from FIG. 28 in accordance with the second embodiment.
Figure 30:
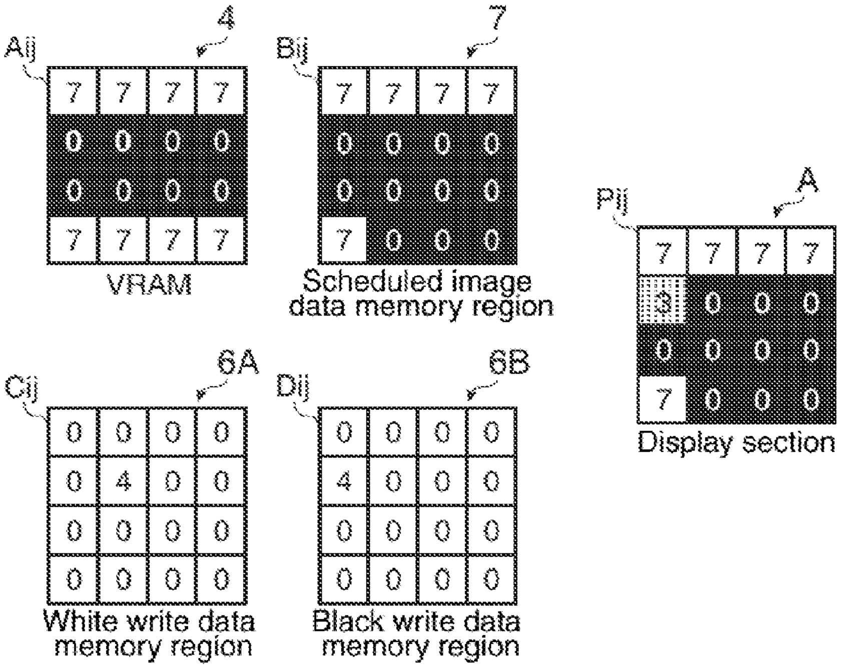
FIG. 30 shows diagrams for describing the operation of the electrophoretic display device 100 in which scheduled image data memory region 7, white write data memory region 6A, black write data memory region 6B, and the display section are changed from FIG. 29 in accordance with the second embodiment.
Figure 31:
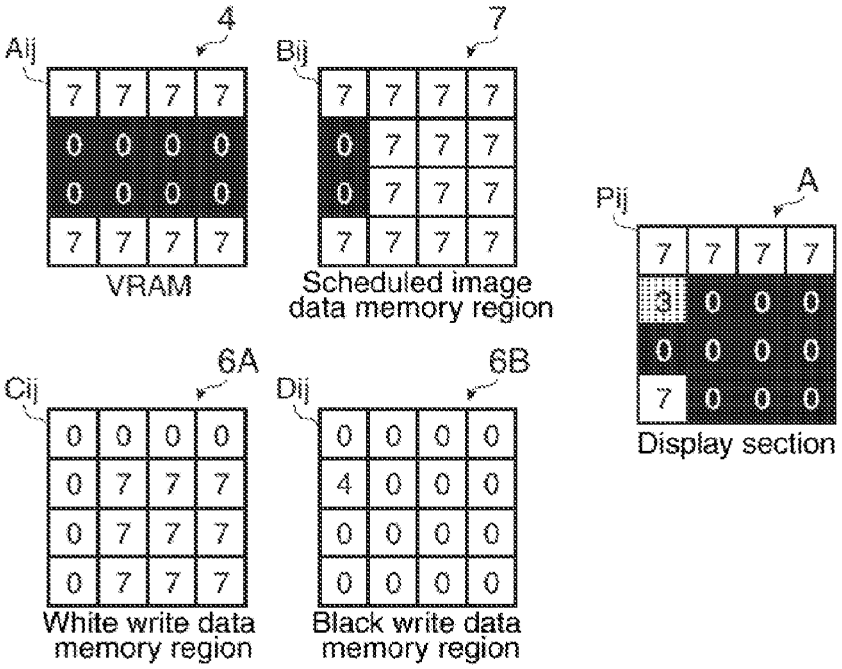
FIG. 31 shows diagrams for describing the operation of the electrophoretic display device 100 in which scheduled image data memory region 7 and white write data memory region 6A are changed from FIG. 30 in accordance with the second embodiment.

Here, 7 is written to the memory regions D22, D23, D24, D32, D33, D34, D42, D43 and D44 by the refresh processing section 208 in step S43 in FIG. 7A, and the memory regions B22 and B42 that are not in black (0) among the memory regions corresponding to the pixels included in the refresh area are rewritten in black in step S33 in FIG. 7A, which results in a state shown in FIG. 28. Thereafter, the process is advanced up to a point where the processes in step S26 in FIG. 27 and step S54 in FIG. 7B have been performed four times, which results in a state shown in FIG. 29. Then, as the process is further advanced up to a point where rewriting of the pixels P23, P24, P31, P32 and P42 is completed, which results in a state shown in FIG. 30. Here, when the pixel P22 is selected in step S47 in FIG. 7A, a judgment YES is made in step S48 in FIG. 7B, and a judgment NO is made in step S55 in FIG. 7B. Accordingly, 7 is written to the memory regions D22, D23, D24, D32, D33, D34, D42, D43 and D44 by the refresh processing section 208 in step S56 in FIG. 7B, and the memory regions B22, B23, B24, B32, B33, B34, B42, B43 and B44 are rewritten in white in step S57 in FIG. 7B, which results in a state shown in FIG. 31.

Figure 32:
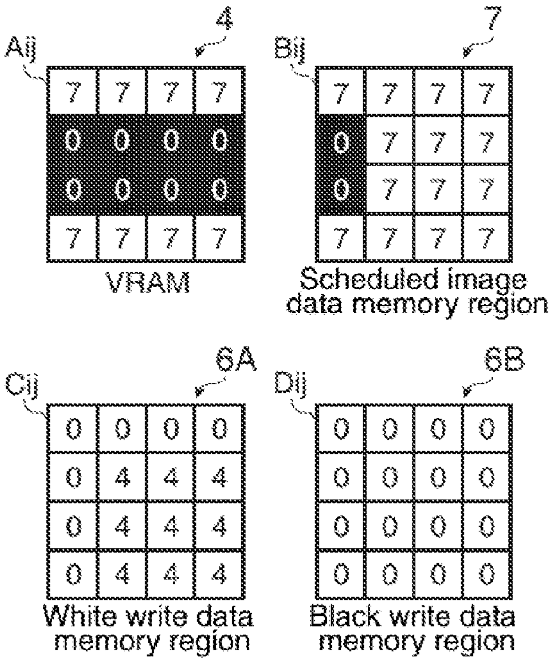
FIG. 32 shows diagrams for describing the operation of the electrophoretic display device 100 in which white write data memory region 6A, black write data memory region 6B, and the display section are changed from FIG. 31 in accordance with the second embodiment.
Figure 33:
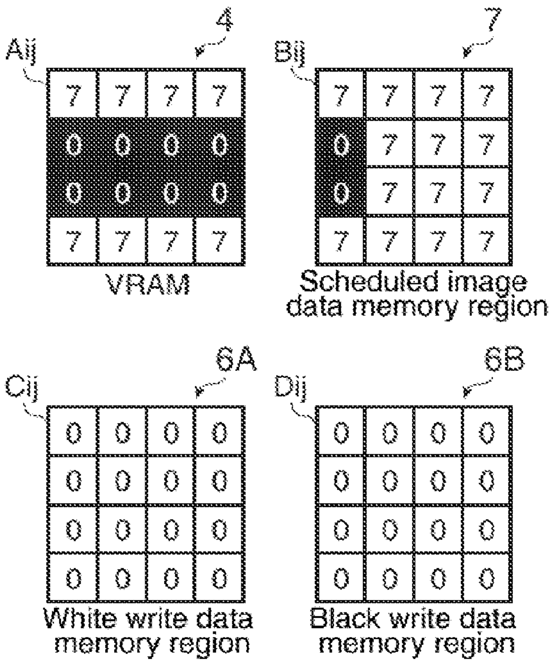
FIG. 33 shows diagrams for describing the operation of the electrophoretic display device 100 in which white write data memory region 6A and the display section are changed from FIG. 32 in accordance with the second embodiment.

Thereafter, when rewriting of the pixel P21 is finished, a state shown in FIG. 32 is attained. As the process is further advanced up to a point where rewriting of the pixels P22, P23, P24, P32, P33, P34, P42, P43 and P44, a state shown in FIG. 33 is attained. Then, when the pixel P22 is selected in step S47 in FIG. 7A, a judgment YES is made in step S48 in FIG. 7B, a judgment YES is made in step S55 in FIG. 7B, and a judgment YES is made in step S59 in FIG. 7B. As a result, the refresh judging section 207 overwrites the added update pixel number stored in the RAM with 0. Then, the refresh processing section 208 releases the occupied refresh area (in the example, the pixels P22, P23, P24, P32, P33, P34, P42, P43 and P44), and overwrites the refresh flag with 0.

Figure 34:
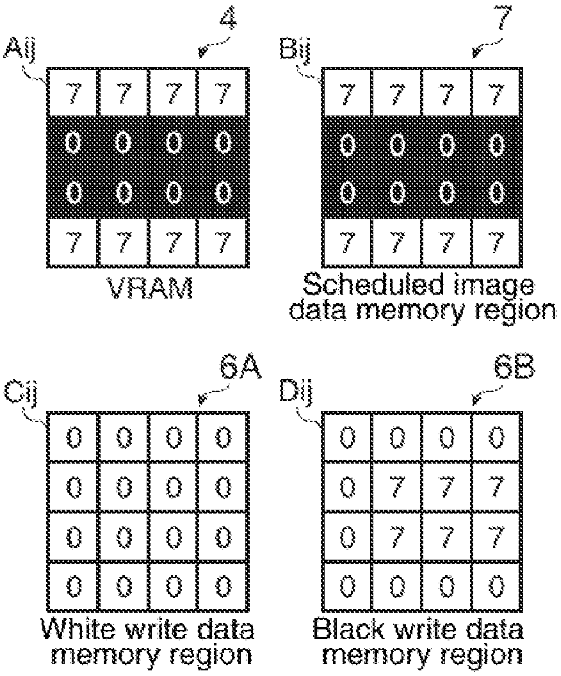
FIG. 34 shows diagrams for describing the operation of the electrophoretic display device 100 in which scheduled image data memory region 7 and black write data memory region 6B are changed from FIG. 33 in accordance with the second embodiment.
Figure 35:
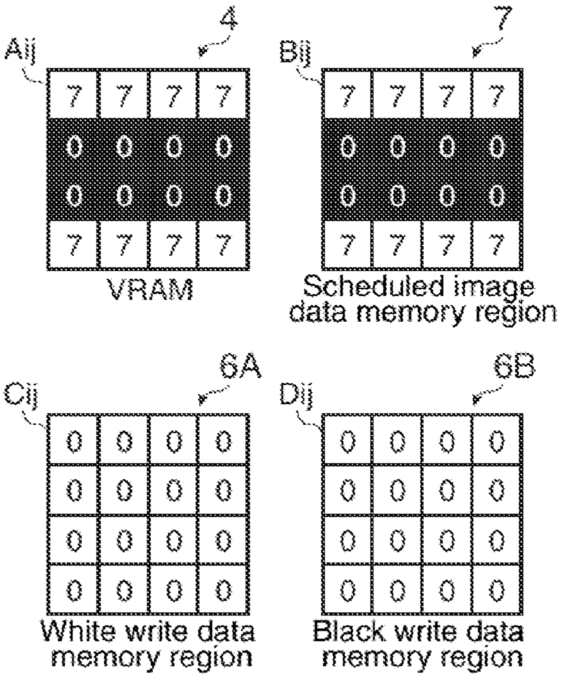
FIG. 35 shows diagrams for describing the operation of the electrophoretic display device 100 in which black write data memory region 6B and the display section are changed from FIG. 34 in accordance with the second embodiment.

Thereafter, as the process is advanced, a judgment NO is made in step S14 in FIG. 27, and a judgment YES is made in step S15 in FIG. 27, and a judgment NO is made in step S17 in FIG. 27 as to each of the selected pixels P22, P23, P24, P32, P33 and P34. By this, 7 is written to each of the memory regions D22, D23, D24, D32, D33 and D34 in step S18 in FIG. 27, and each of the memory regions B22, B23, B24, B32, B33 and B34 is written with the content of each of the corresponding memory regions A22, A23, A24, A32, A33 and A34 in step S19 in FIG. 27. As a result, a state shown in FIG. 34 is attained. Then, the process is further advanced and, finally, a state shown in FIG. 35 is attained.

In this manner, the second embodiment can achieve effects similar to those of the first embodiment. Also, in accordance with the second embodiment, refreshing can be performed at the timing when the number of times of scheduled rewriting becomes a threshold value or greater in the unit of a pixel.

Third Embodiment

Next, a third embodiment is described. The third embodiment is different from the first embodiment and the second embodiment in the hardware configuration of the electrophoretic display device 100, process contents of the refresh judging section 207 and a part of the flow chart thereof. Description of other portions of the third embodiment which are similar to those of the first and second embodiments will be omitted.

Figure 36:
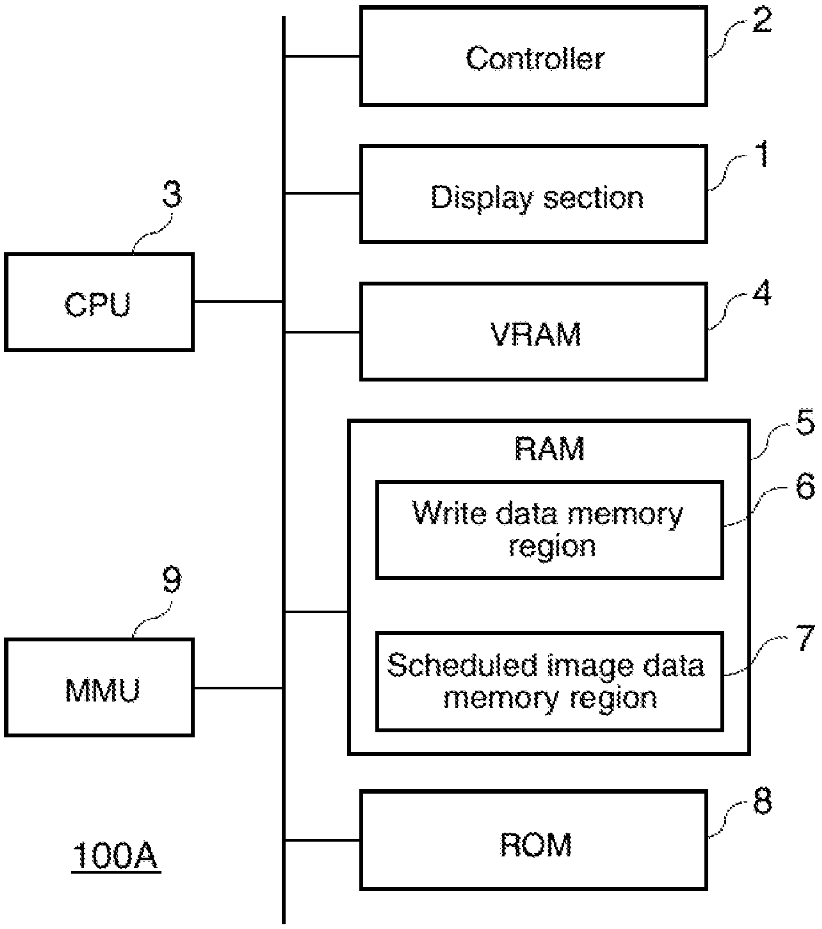
FIG. 36 is a block diagram of the hardware configuration of an electrophoretic display device 100A.

FIG. 36 is a block diagram of the hardware configuration of an electrophoretic display device 100A. The electrophoretic display device 100A is equipped with a memory management unit (MMU) 9, which is different from the electrophoretic display device 100. The MMU 9 processes memory accesses requested by the CPU 3. More specifically, when rewriting is performed by the CPU 3 for one of the pixels included in the memory region corresponding to the refresh area in the VRAM 4, the MMU 9 notifies the refresh judging section 207 of the event. Upon receiving the notification, the refresh judging section 207 adds 1 to a variable called a VRAM rewrite number stored in the RAM 5. It is noted that the VRAM rewrite number is the number of times the CPU 3 has rewritten one of the pixels included in the memory region corresponding to the refresh area in the VRAM 4. Also, the event of rewriting one of the pixels included in the memory region corresponding to the refresh area in the VRAM 4 is not limited to an event where the pixel is written from white to black or black to white, but also includes an event where the pixel is written from black to black or white to white (in other words, overwritten). When the value of the VRAM rewrite number is equal to or greater than a predetermined threshold value stored in the ROM 8, the refresh judging section 207 judges that the refresh condition is met. When the value of the VRAM rewrite number is less than the threshold value, it is judged that the refresh condition is not met. In other words, the VRAM rewrite number is an example of a value relating to the number of times of rewriting, and may be an example of the number of pixels among a group of pixels specified by the specifying device with which rewriting from the first display state to the second display state is performed, an example of the number of pixels among a group of pixels specified by the specifying device with which rewriting from the second display state to the first display state is performed, an example of the number of pixels among a group of pixels specified by the specifying device with which rewriting from the first display state to the first display state is performed, and an example of the number of pixels among a group of pixels specified by the specifying device with which rewriting from the second display state to the second display state is performed.

Figure 37:
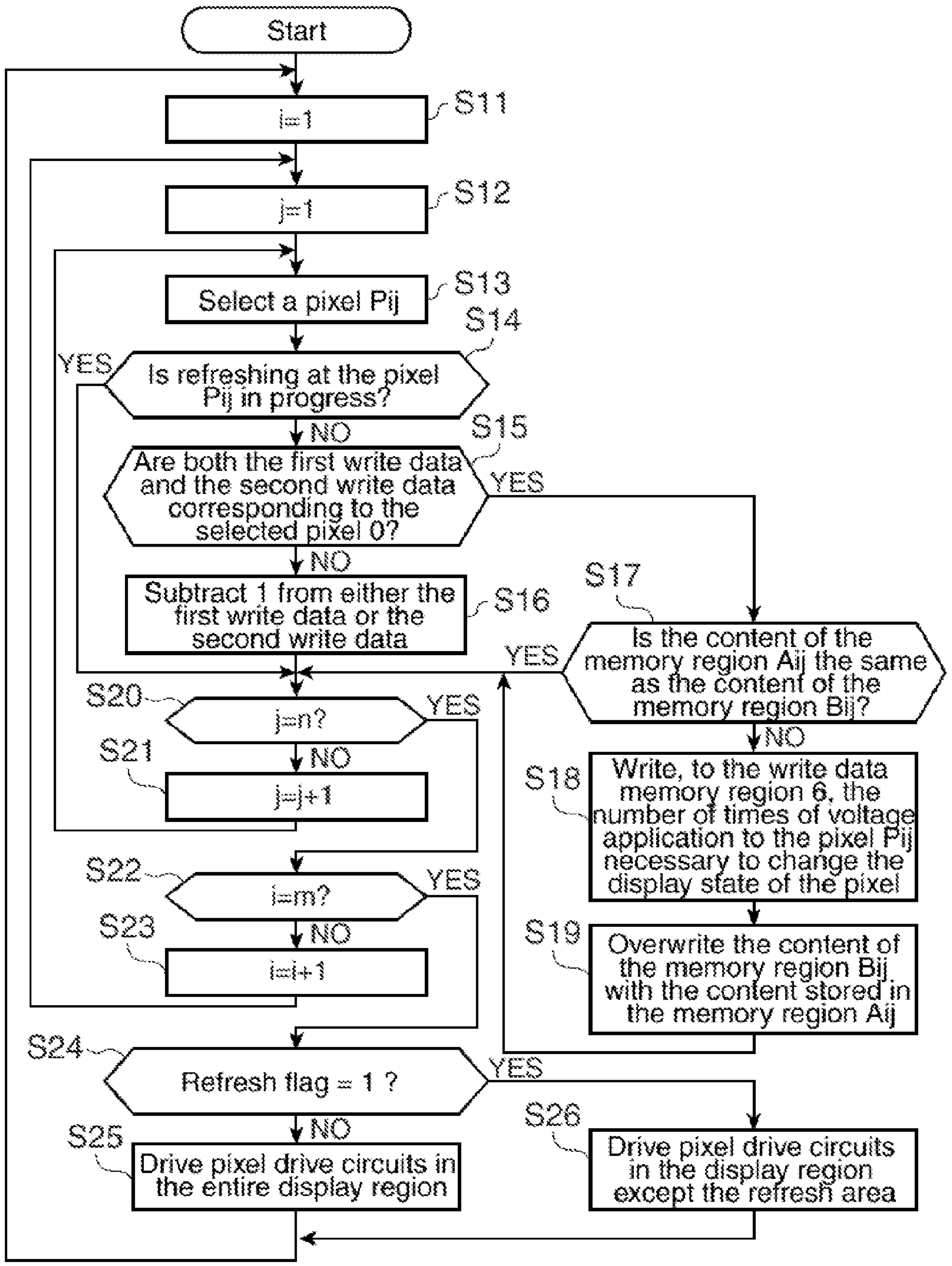
FIG. 37 is a flow chart of processes performed by a controller 2 in accordance with a third embodiment.

FIG. 37 is a flow chart of processes performed by the controller 2 in accordance with a third embodiment. In FIG. 37, processes in step S27 and step S28 in FIG. 6 in accordance with the first embodiment are not present, and processes in step S19*b* and S19*c* in FIG. 27 in accordance with the second embodiment are not present.

Figure 38A:
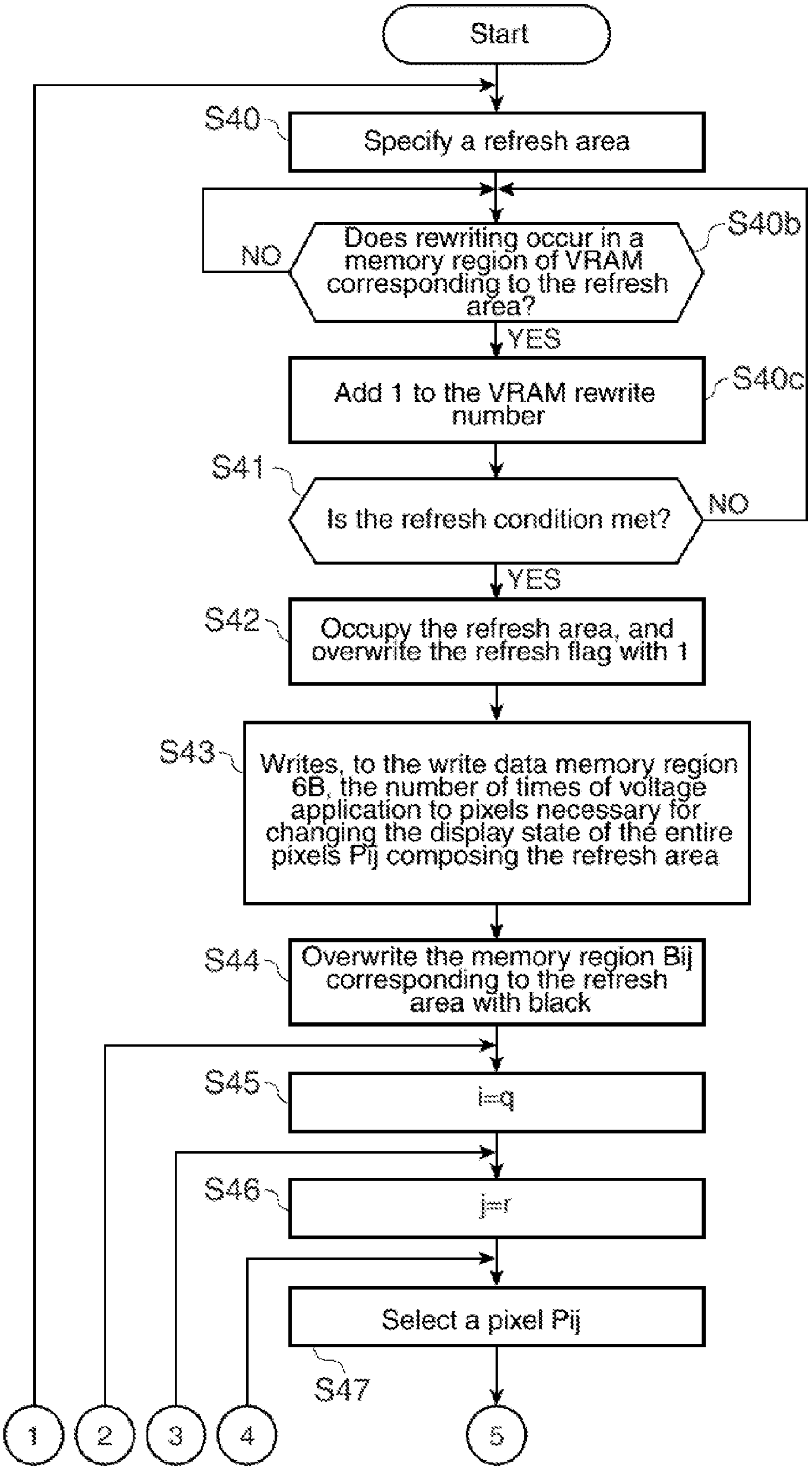
FIG. 38A is a first portion of a flow chart of a refresh process in accordance with the third embodiment.
Figure 38B:
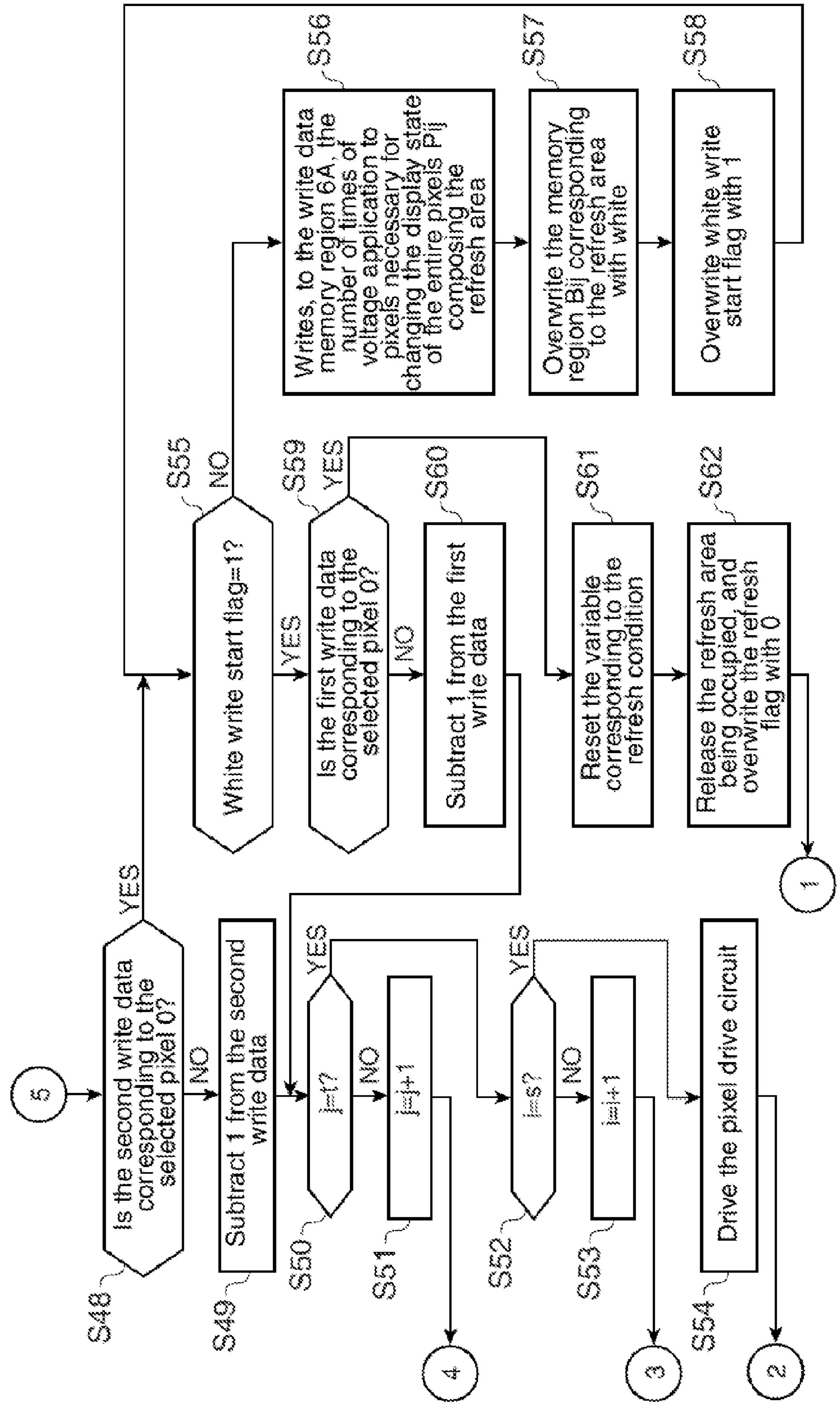
FIG. 38B is a second portion of the flow chart shown in FIG. 38A of the refresh process in accordance with the third embodiment.

FIGS. 38A and 38B are flow charts of the refreshing process in accordance with the third embodiment. The refresh area specifying section stores information of pixels Pij composing a refresh area specified (step S40 in FIG. 38). Then, when the CPU 3 performs rewriting for one of the pixels included in the memory region corresponding to the refresh area in the VRAM 4, the MMU 9 notifies the refresh judging section 207 of the event (step S40*b* in FIG. 38A; YES), and the refresh judging section 207 adds 1 to the VRAM rewrite number stored in the RAM 5 (step S40*c* in FIG. 38A). Then, when the refresh judging section 207 judges that the value of the VRAM rewrite number equals to or greater than a predetermined threshold value stored in the ROM 8 (step S41 in FIG. 38A; YES), the process proceeds to step S42 in FIG. 38A, and refreshing is started. As the process advances up to a point where a judgment YES is made in step S59 in FIG. 38B, in other words, the refreshing is completed, the refresh judging section 207 overwrites the VRAM rewrite number stored in the RAM 5 with 0 (step S61 in FIG. 38B).

Next, the operation of the electrophoretic display device 100 in accordance with the third embodiment will be described with reference to the flow charts in FIGS. 37, 38A and 38B, FIGS. 8-19, and FIGS. 39-46. More specifically, changes in the display on the display section 1, changes in the contents of the VRAM 4, changes in the contents of the scheduled image data memory region 7 and changes in the contents of the write data memory region 6 from the time when image data is written to the VRAM4 until an image of the image data is displayed on the display section 1 are described. Here, it is assumed that the pixels P22, P23, P24, P32, P33 and P34 are specified by the refresh area specifying section 206 as a refresh area. Also, the threshold value of the VRAM rewrite number that serves as a judgment reference for performing refreshing is assumed to be "13."

When the CPU 3 writes image data to the VRAM 4 when the display on the display device 1, the VRAM 4, the write data memory region 6 and the scheduled image data memory region 7 are in a state shown in FIG. 8, the state of the VRAM 4 assumes a state shown in FIG. 9 according to the image data. Here, for each of the memory regions A22, A33 and A34, a judgment YES is made in step S40*b* in FIG. 38A, and an addition of 1 to the VRAM rewrite number is performed each time. As a result, the value of the VRAM rewrite number becomes "3." As the process is advanced from the state shown in FIG. 9 up to a point where the CPU 3 writes image data to the VRAM 4 when the display on the display device 1, the VRAM 4, the write data memory region 6 and the scheduled image data memory region 7 are in a state shown in FIG. 15, the state of the VRAM 4 assumes a state shown in FIG. 16 according to the image data. Here, for each of the memory regions A22, A23, A24, A32, A33 and A34, a judgment YES is made in step S40*b* in FIG. 38A, and an addition of 1 to the VRAM rewrite number is performed each time. As a result, the value of the VRAM rewrite number becomes "9."

Figure 39:
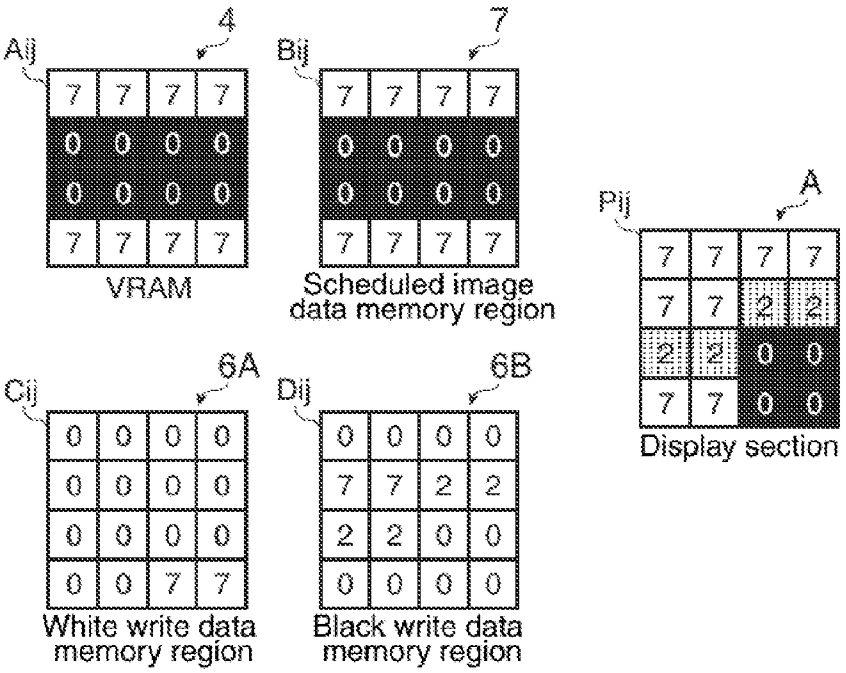
FIG. 39 shows diagrams for describing the operation of the electrophoretic display device 100A in which scheduled image data memory region 7, white write data memory region 6A, black write data memory region 6B, and the display section are changed from FIG. 19 in accordance with the third embodiment.
Figure 40:
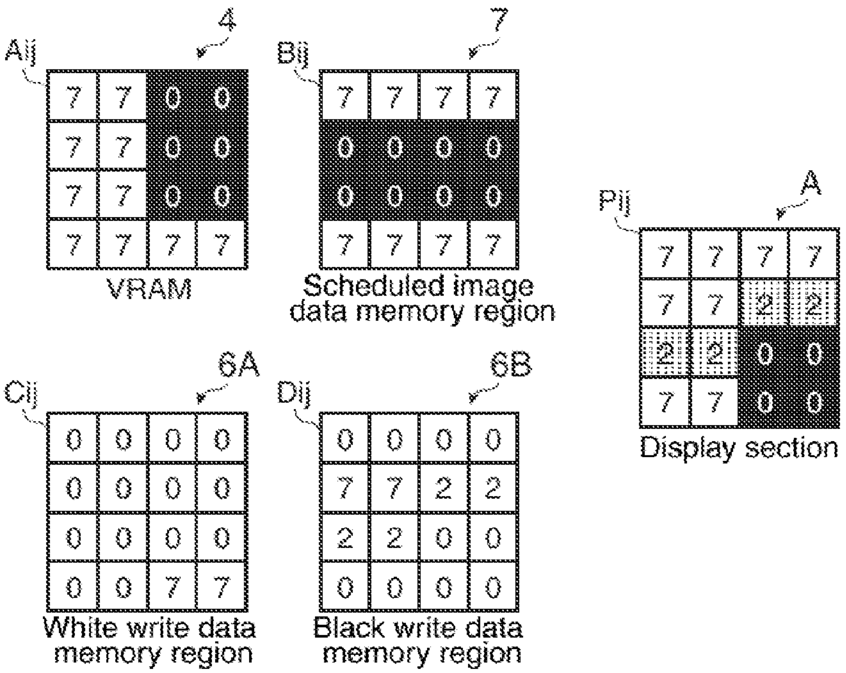
FIG. 40 shows diagrams for describing the operation of the electrophoretic display device 100 in which VRAM 4 is changed from FIG. 39 in accordance with the third embodiment.

Let us assume that the process is further advanced from the state shown in FIG. 16 to the state shown in FIG. 19, and to a state shown in FIG. 39. When the CPU 3 writes image data to the VRAM 4 when the display on the display device 1, the VRAM 4, the write data memory region 6 and the scheduled image data memory region 7 are in the state shown in FIG. 39, the state of the VRAM 4 assumes a state shown in FIG. 40 according to the image data. Here, for each of the memory regions A23, A24, A33 and A34, a judgment YES is made in step S40*b* in FIG. 38A, and an addition of 1 to the VRAM rewrite number is performed each time. As a result, the value of the VRAM rewrite number becomes "13." At this moment, the value of the VRAM rewrite number is equal to or greater than the threshold value, such that a judgment YES is made in step S41 in FIG. 38A. Accordingly, the refresh processing section 208 provides an interrupt to the write control section 203, thereby occupying the pixels P22, P23, P24, P32, P33 and P34 which define the refresh area, and overwrites the refresh flag with 1. Then, in parallel with the writing operation to the display region other than the refresh area by the write control section 203, the refresh processing section 208 starts refreshing with respect to the refresh area.

Figure 41:
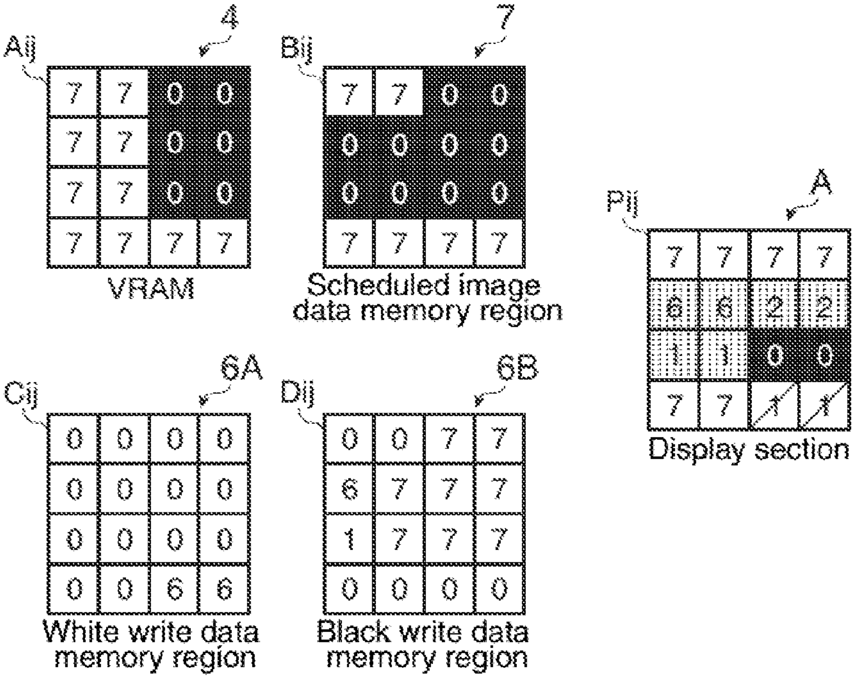
FIG. 41 shows diagrams for describing the operation of the electrophoretic display device 100 in which scheduled image data memory region 7, white write data memory region 6A, black write data memory region 6B, and the display section are changed from FIG. 40 in accordance with the third embodiment.
Figure 42:
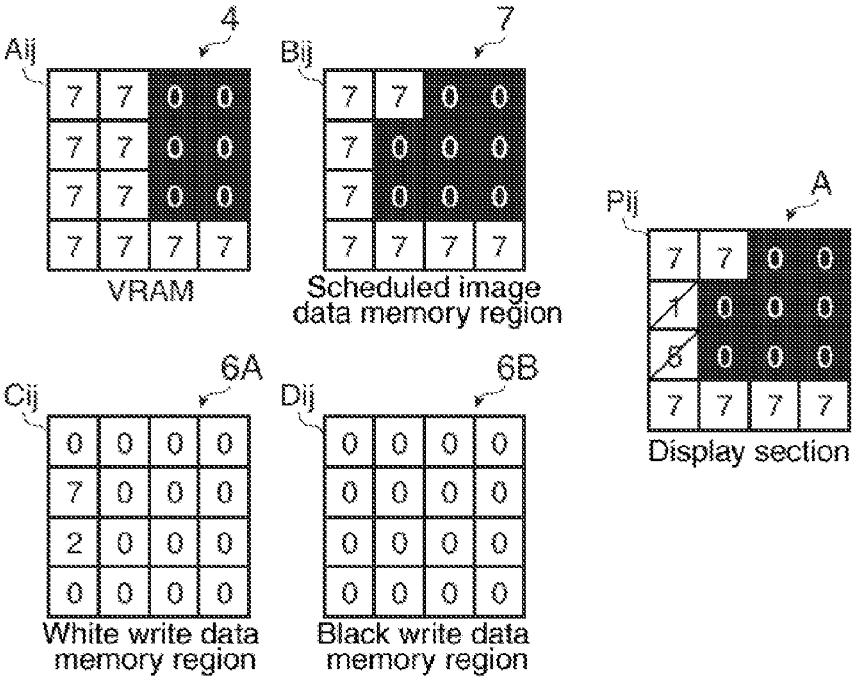
FIG. 42 shows diagrams for describing the operation of the electrophoretic display device 100 in which scheduled image data memory region 7, white write data memory region 6A, black write data memory region 6B, and the display section are changed from FIG. 41 in accordance with the third embodiment.
Figure 43:
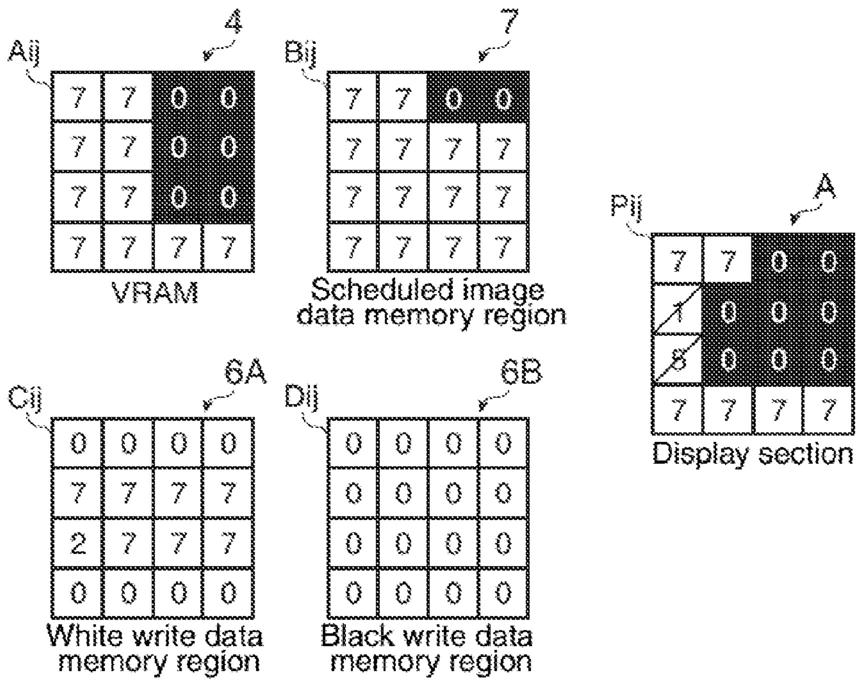
FIG. 43 shows diagrams for describing the operation of the electrophoretic display device 100 in which scheduled image data memory region 7 and white write data memory region 6A are changed from FIG. 42 in accordance with the third embodiment.

Then, 7 is written to the memory regions D22, D23, D24, D32, D33 and D34 in step S43 in FIG. 38A by the refresh processing section 208. Also, in step S44 in FIG. 38A, the memory regions B22, B23, B24, B32, B33 and B34 are written with black. Also, as the process is advanced along with the process flows shown in FIGS. 38A and 38B and the process flow shown in FIG. 37 performed in parallel, a state shown in FIG. 41 is attained. As the process is further advanced along with the process flows shown in FIG. 37, FIGS. 38A and 38B performed in parallel up to a point where writing the refresh area with black is completed, a state shown in FIG. 42 is attained. Here, as the pixel P22 is selected in step S47 in FIG. 38A, a judgment YES is made in step S48 in FIG. 38B, and a judgment NO is made in step S55 in FIG. 38B. Accordingly, 7 is written to the memory regions C22, C23, C24, C32, C33 and C34 in step S56 in FIG. 38B by the refresh processing section 208. Also, in step S57, the memory regions B22, B23, B24, B32, B33 and B34 are written with white, which result in a state shown in FIG. 43.

Figure 44:
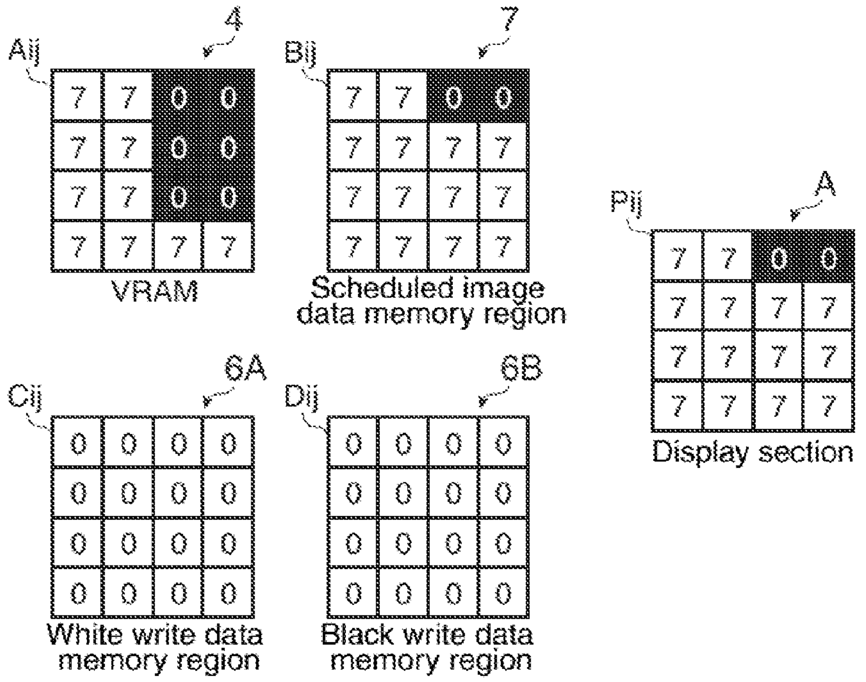
FIG. 44 shows diagrams for describing the operation of the electrophoretic display device 100 in which white write data memory region 6A and the display section are changed from FIG. 43 in accordance with the third embodiment.
Figure 45:
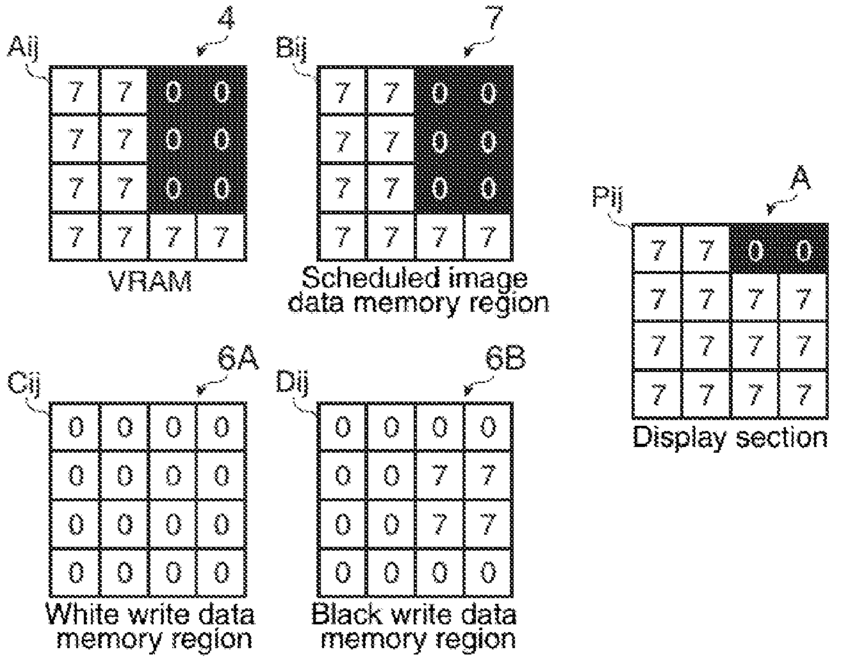
FIG. 45 shows diagrams for describing the operation of the electrophoretic display device 100 in which scheduled image data memory region 7 and black write data memory region 6B are changed from FIG. 44 in accordance with the third embodiment.

Then, as the process is further advanced along with the process flows shown in FIG. 37, FIGS. 38A and 38B performed in parallel up to a point where writing the refresh area with white is completed, a state shown in FIG. 44 is attained. Here, as the pixel P22 is selected in step S47 in FIG. 38A, a judgment YES is made in step S48 in FIG. 38B, a judgment YES is made in step S55 in FIG. 38B, and a judgment YES is made in step S59 in FIG. 38B, such that the refresh judging section 207 overwrites the VRAM rewrite time stored in the RAM with 0. Then, the refresh processing section 207 releases the refresh area being occupied (i.e., the pixels P22, P23, P24, P32, P33 and P34 in this embodiment), and overwrites the refresh flag with 0.

Figure 46:
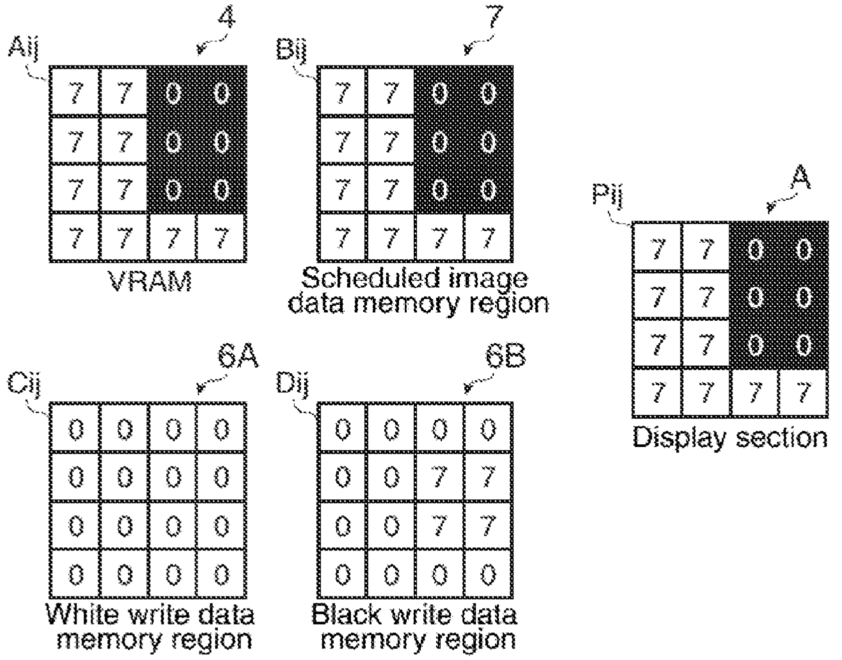
FIG. 46 shows diagrams for describing the operation of the electrophoretic display device 100 in which the display section is changed from FIG. 45 in accordance with the third embodiment.

Thereafter, the process is advanced up to a point where, for each of the selected pixels P23, P24, P33 and P34, a judgment NO is made in step S14 in FIG. 37, a judgment YES is made in step S15 in FIG. 37, and a judgment NO is made in step S17 in FIG. 37. By this, 7 is written to the memory regions D23, D24, D33 and D34 in step S18 in FIG. 37, and each of the memory regions B23, B24, B33 and B34 is written with the content of each the corresponding memory regions A23, A24, A33 and A34 in step S19 in FIG. 37, respectively. This results in a state shown in FIG. 45. Thereafter, the process is further advanced up to a point where a state shown in FIG. 46 is finally presented.

According to the third embodiment, effects similar to those of the first embodiment can be attained. Also, in accordance with the third embodiment, refreshing can be performed at the timing when the number of times of rewriting to the VRAM in the unit of a pixel becomes equal to or greater than a threshold value.

Figure 47A:
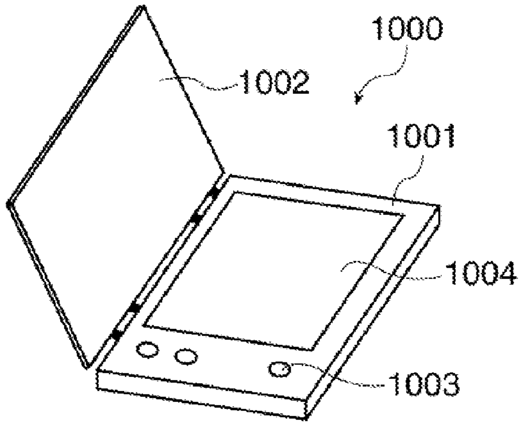
FIGS. 47A, 47B and 47C are perspective views showing application examples of a display device in accordance with embodiments of the invention.
Figure 47B:
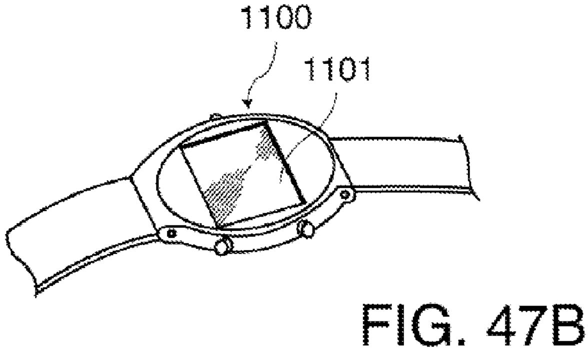
Figure 47C:
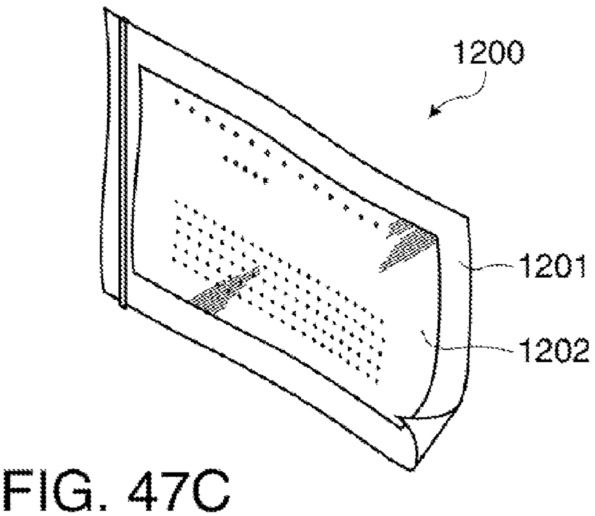

FIGS. 47A-47C are perspective views of applications examples of the display device equipped with the control device in accordance with any one of the embodiment of the invention. FIG. 47A is a perspective view of an electronic book. The electronic book 1000 is provided with a book-shaped frame 1001, a cover 1002 that can be freely opened and closed with respect to the frame 1001, an operation portion 1003, and a display section 1004 composed of a display device equipped with the control device in accordance with an embodiment of the invention. FIG. 47B is a perspective view of a wrist watch 1100. The wrist watch 1100 is provided with a display section 1101 composed of a display device equipped with the control device in accordance with the embodiment of the invention. FIG. 47C is a perspective view of an electronic paper 1200. The electronic paper 1200 is equipped with a main body section 1201 composed of a rewritable sheet having paper-like texture and flexibility, and a display section 1202 composed of a display device equipped with the control device in accordance with an embodiment of the invention. In addition to the above, a display device equipped with the control device in accordance with the above-described embodiment is applicable to other electronic apparatuses that use visual changes in color tone accompanying migration of charged particles, such as, a personal computer, a PDA, and the like.

The above-described embodiments can be modified in manners described below. It is noted that the modification examples may be appropriately combined with each other and implemented.

Modification Example 1

In the embodiments described above, as a typical example of a refresh area, a text input box where writing is frequently performed by the user is described. However, the refresh area is not limited to the above. For example, an area where display contents are frequently changed may be specified as a refresh area.

Modified Example 2

In the embodiments described above, the controller 2 includes the rewrite judging section 201 and the scheduled image update section 205. However, the rewrite judging section 201 and the scheduled image update section 205 may be implemented as functions of the CPU 3. In this case, the controller 2 does not need to refer to the contents of the VRAM 4.

Modified Example 3

In each of the first, second and third embodiments, the controller 2 is equipped with the functions including the rewrite judging section 201, the write state judging section 202, the write control section 203, the data update section 204, the scheduled image update section 205, the refresh area specifying section 206, the refresh judging section 207, and the refresh processing section 208. Each of these functions may be realized by hardware. Alternatively, the controller 2 may be provided with a CPU, and the CPU may execute a program to realize each of the functions.

Modified Example 4

In the embodiments described above, two types of electrophoretic particles, black and white electrophoretic particles, one of them being positively charged and the other being negatively charged, are used to display black and white. However, the invention is applicable not only to black and white display, but also display caused by changes in density in two directions, such as, red and white, blue and black and the like caused by difference in density.

Modification Example 5

The display section 1 is not limited to those shown in FIGS. 2-4. For example, the electrophoretic layer is not limited to a configuration having numerous microcapsules 21, but may have a configuration in which dispersion medium and electrophoretic particles are stored in spaces divided by partition walls.

Also, in the embodiments described above, the electrophoretic display device 100 equipped with the display section 1 using an electrophoretic method is described as an example of a display device. However, the display method of the display section 1 is not limited to the electrophoretic method. As the display method of the display section 1, a relatively low-speed display method may be used which is controlled by a method in which voltages are applied through a plurality of frames until a completion of display, such as, for example, a system using cholesteric liquid crystal, electrochromic material, electronic particle fluid or the like.

Modification Example 6

Also, the present invention is applicable to an electrophoretic display device using a system in which electrophoretic particles are migrated by controlling only the potential on pixel electrodes to a high potential and a low potential (i.e., a bipolar driving system), and to an electrophoretic display device using a system in which both of pixel electrodes and the common electrode are controlled to a high potential and a low potential (a mono-polar driving method).

Modification Example 7

The controller 2 and the CPU 3 may be mounted on independent devices, or may be mounted on a single chip, such as, a SoC (System-ON-a-Chip).

Modification Example 8

Until new image data is transferred from outside, when pixel data that is subject to drive voltage application does not exist any longer in the write data memory region 6, and the content of the VRAM 4 and the content of the scheduled image data memory region 7 concur with each other, in other words, when voltage application becomes unnecessary for a while, the process may proceed to a different state, such as, for example, a power-saving state.

Modification Example 9

In the embodiments described above, the write data memory region 6 and the scheduled image data memory region 7 are configured with independent different planes (a planar method). However, the write data memory region 6 and the scheduled image data memory region 7 may not be treated as independent separate planes, but may be gathered together into a single plane (a packed pixel method).

Modification Example 10

In each of the embodiments described above, when the frame number count, the added update pixel number, or the VRAM rewrite number becomes equal to or greater than a threshold value, the refresh processing section 208 provides an interrupt to the write control section 203, thereby occupying the refresh area, overwrites the refresh flag with 1, and starts a refreshing process. However, the invention is not limited to the above. Instead, even when the frame number count, the added update pixel number, or the VRAM rewrite number becomes equal to or greater than a threshold value, normal writing may be performed without giving an interrupt until values of the write data memory region 6 for all of the pixels in the refresh area become 0, and then, a refresh process may be started. By so doing, the pixels in the refresh area at the time of completion of the refresh process do not vary in gradation change history such that it is possible to control failures of occurrence of afterimages based on different gradation change history at the time of completion of the refresh process. In accordance with this modification example, each of the pixels immediately before refreshing is exhibited in a white display or in a black display. In this case, the refreshing process may preferably be started with a step of changing the gradation of pixels that are subject to refreshing to a gradation opposite to the gradation immediately before refreshing. For example, the refreshing process may be started with a step of changing pixels that are in a white display immediately before refreshing to a black display, and a step of changing pixels that are in a black display immediately before refreshing to a white display. It is also possible that, thereafter, each of the pixels may be changed to a white display or a black display a plurality of times. By so doing, for example, it is possible to suppress failures in which DC balance is destroyed due to overwriting of voltages for a white display over pixels in a white display state.

The entire disclosure of Japanese Patent Application No. 2010-207248, filed Sep. 15, 2010 is expressly incorporated by reference herein.

What is claimed is:

1. A control device comprising:

a writing device that writes an image according to image data to a plurality of pixels that compose a display section, each of the plurality of pixels assuming one of a plurality of display states including at least a first display state and a second display state by the writing device;

a specifying device that specifies a group of pixels that is subject to refreshing among the plurality of pixels; and a refresh processing device that performs refreshing for the group of pixels when a count of the number of times of image writing performed by the writing device with respect to the group of pixels specified by the specifying device since the last refreshing is equal to or greater than a threshold value, wherein the threshold value is representative of a predetermined count representing the number of times that writing is performed, with respect to at least one pixel among the group of pixels specified by the specifying device, from the first display state to the second display state, and the number of times that writing is performed, with respect to at least one pixel among the group of pixels specified by the specifying device, from the second display state to the first display state, wherein, while the refresh processing device is performing refreshing, the writing device does not perform image writing with respect to the group of pixels that is subject to the refreshing, but performs image writing with respect to a group of pixels that is not subject to the refreshing.

2. A control device according to claim 1, wherein the writing device includes:

a rewrite judging device that judges as to whether or not a new write instruction occurs with respect to one pixel of the plurality of pixels;

a write state judging device that judges, when it is judged that the new write instruction occurs, as to whether or not an image write operation is in progress with respect to the one pixel; and a write control device that, when the write state judging device judges that a write operation is not in progress with respect to the one pixel, stores first write data indicative of the number of times of drive voltage application to change the display state of the pixel from the first display state to the second display state, or second write data indicative of the number of times of drive voltage application to change the display state of the pixel from the second display state to the first display state in a first memory region, and performs a write control of applying a drive voltage a plurality of times to the one pixel based on the first write data or the second write data stored in the first memory region, and, when the write state judging device judges that a write operation is in progress with respect to the one pixel, continues the write operation in progress, and performs the write control upon completion of the write operation.

3. A display device comprising the control device recited in claim 1.

4. A control device comprising:

a writing device that writes an image according to image data to a plurality of pixels that compose a display section, each of the plurality of pixels being given one of a plurality of display states including at least a first display state and a second display state by writing performed by the writing device;

a specifying device that specifies a group of pixels that is subject to refreshing among the plurality of pixels; and a refresh processing device that performs refreshing for the group of pixels when a count determined since the last refreshing is equal to or greater than a threshold value, wherein the threshold value is representative of a predetermined count representing the number of pixels with which writing is performed among the group of pixels specified by the specifying device from the first display state to the second display state, and the number of pixels with which writing is performed among the group of pixels specified by the specifying device from the second display state to the first display state, wherein, while the refresh processing device is performing refreshing, the writing device does not perform image writing with respect to the group of pixels that is subject to the refreshing, but performs image writing with respect to a group of pixels that is not subject to the refreshing.

5. A control device comprising:

a writing device that writes an image according to image data to a plurality of pixels that compose a display section, each of the plurality of pixels being given one of a plurality of display states including at least a first display state and a second display state by writing performed by the writing device;

a specifying device that specifies a group of pixels that is subject to refreshing among the plurality of pixels; and a refresh processing device that performs refreshing for the group of pixels when a count determined since the last refreshing is equal to or greater than a threshold value, wherein the threshold value is representative of a predetermined count representing the number of pixels with which writing is performed among the group of pixels specified by the specifying device from the first display state to the second display state, the number of pixels with which writing is performed among the group of pixels specified by the specifying device from the second display state to the first display state, the number of pixels with which overwriting is performed among the group of pixels specified by the specifying device from the first display state to the first display state, and the number of pixels with which overwriting is performed among the group of pixels specified by the specifying device from the second display state to the second display state, wherein, while the refresh processing device is performing refreshing, the writing device does not perform image writing with respect to the group of pixels that is subject to the refreshing, but performs image writing with respect to a group of pixels that is not subject to the refreshing.

6. A control method for a display device equipped with a display section composed of a plurality of pixels, the control method comprising:

a specifying step of specifying a group of pixels that is subject to refreshing among the plurality of pixels, each of the plurality of pixels assuming one of a plurality of display states including at least a first display state and a second display state;

a refresh processing step of refreshing the group of pixels when a count of the number of times of image writing according to image data with respect to the group of pixels specified by the specifying step since the last refreshing is equal to or greater than a threshold value, wherein the threshold value is representative of a predetermined count representing the number of times that writing is performed, with respect to at least one pixel among the specified group of pixels, from the first display state to the second display state, and the number of times that writing is performed, with respect to at least one pixel among the specified group of pixels, from the second display state to the first display state; and a writing step of, while the refresh processing step is performing refreshing, not performing image writing according to image data with respect to the group of pixels that is subject to the refreshing, but performing image writing according to image data with respect to a group of pixels that is not subject to the refreshing.

* * * * *